United States Patent
Iyer

(10) Patent No.: US 10,484,741 B2
(45) Date of Patent: *Nov. 19, 2019

(54) SYSTEMS AND METHODS FOR ENABLING A USER TO GENERATE A PLAN TO ACCESS CONTENT USING MULTIPLE CONTENT SERVICES

(71) Applicant: OpenTV, Inc., San Francisco, CA (US)

(72) Inventor: Nandini Iyer, Fremont, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/184,727

(22) Filed: Nov. 8, 2018

(65) Prior Publication Data

US 2019/0182551 A1    Jun. 13, 2019

Related U.S. Application Data

(63) Continuation of application No. 15/882,560, filed on Jan. 29, 2018, now Pat. No. 10,142,695, which is a
(Continued)

(51) Int. Cl.
*H04N 7/15* (2006.01)
*H04N 21/475* (2011.01)
(Continued)

(52) U.S. Cl.
CPC ..... *H04N 21/4755* (2013.01); *G06Q 30/0611* (2013.01); *H04N 21/2543* (2013.01);
(Continued)

(58) Field of Classification Search
CPC .......... H04N 21/4755; H04N 21/2543; H04N 21/4532
See application file for complete search history.

(56) References Cited

U.S. PATENT DOCUMENTS 9,883,245 B2  1/2018  Iyer
10,142,695 B2  11/2018  Iyer
(Continued)

FOREIGN PATENT DOCUMENTS

| | | |
|---|---|---|
| IN | 201817004512 A | 4/2018 |
| TW | 201724867 A | 7/2017 |
| WO | WO-2017040549 A1 | 3/2017 |

OTHER PUBLICATIONS

"U.S. Appl. No. 14/840,785, 312 Amendment filed Dec. 11, 2017", 6 pgs.
(Continued)

*Primary Examiner* — Olugbenga O Idowu
(74) *Attorney, Agent, or Firm* — Schwegman Lundberg & Woessner, P.A.

(57) ABSTRACT

A system for facilitating access to items of content presents recommendations to a user. Items of content may include movies and television shows. Recommendations may include access plans specifying a plurality of digital media services, where each specified digital media service provides availability to items of content included in a user defined set. Further, recommendations may be based on one or more use defined constraints. User defined constraints may include a user budget for accessing items of content during a specific time period.

20 Claims, 12 Drawing Sheets

Related U.S. Application Data continuation of application No. 14/840,785, filed on Aug. 31, 2015, now Pat. No. 9,883,245.

(51) Int. Cl.
*H04N 21/4627* (2011.01)
*H04N 21/458* (2011.01)
*H04N 21/45* (2011.01)
*H04N 21/2543* (2011.01)
*G06Q 30/06* (2012.01)

(52) U.S. Cl.
CPC ....... *H04N 21/458* (2013.01); *H04N 21/4532* (2013.01); *H04N 21/4627* (2013.01); *H04N 21/4756* (2013.01)

(56) References Cited

U.S. PATENT DOCUMENTS

| | | | | |
|---|---|---|---|---|
| 2005/0246739 | A1* | 11/2005 | Davidson | G06Q 20/3674 725/45 |
| 2007/0028258 | A1* | 2/2007 | Wollmershauser | G06Q 30/06 725/29 |
| 2007/0067800 | A1* | 3/2007 | Wachtfogel | G11B 27/002 725/42 |
| 2008/0313672 | A1* | 12/2008 | Migos | H04N 5/44543 725/40 |
| 2010/0146559 | A1* | 6/2010 | Lee | H04L 12/1822 725/61 |
| 2014/0049651 | A1 | 2/2014 | Voth | |
| 2015/0020106 | A1* | 1/2015 | Belyaev | H04N 21/4622 725/45 |
| 2015/0088869 | A1 | 3/2015 | Funk et al. | |
| 2015/0312341 | A1* | 10/2015 | Smith | G06F 17/30843 709/213 |
| 2017/0064397 | A1 | 3/2017 | Iyer | |
| 2018/0220193 | A1 | 8/2018 | Iyer | |

OTHER PUBLICATIONS

"U.S. Appl. No. 14/840,785, Examiner Interview Summary date Jul. 13, 2017", 3 pgs.

"U.S. Appl. No. 14/840,785, Final Office Action dated Apr. 12, 2017", 18 pgs.

"U.S. Appl. No. 14/840,785, Non Final Office Action dated Sep. 9, 2016", 15 pgs.

"U.S. Appl. No. 14/840,785, Notice of Allowance dated Sep. 12, 2017", 5 pgs.

"U.S. Appl. No. 14/840,785, Response filed Jan. 26, 2017 to Non Final Office Action dated Sep. 9, 2016", 10 pgs.

"U.S. Appl. No. 14/840,785, Response filed Jul. 10, 2017 to Final Office Action dated Apr. 12, 2017", 11 pgs.

"U.S. Appl. No. 15/882,560, Notice of Allowance dated Jul. 27, 2018", 14 pgs.

"U.S. Appl. No. 15/882,560, Preliminary Amendment filed Apr. 23, 2018", 8 pgs.

"European Application Serial No. 16767412.6, Response filed Oct. 23, 2018 to Communication pursuant to Rules 161(1) and 162 EPC dated Apr. 18, 2018", 14 pgs.

"International Application Serial No. PCT/US2016/049531, International Preliminary Report on Patentability dated Mar. 15, 2018", 8 pgs.

"International Application U.S. Appl. No. PCT/US2016/049531, International Search Report dated Oct. 21, 2016", 6 pgs.

"International Application Serial No. PCT/US2016/049531, Written Opinion dated Oct. 21, 2016".

"European Application Serial No. 16767412.6, Communication Pursuant to Article 94(3) EPC dated Sep. 11, 2019", 5 pages.

* cited by examiner

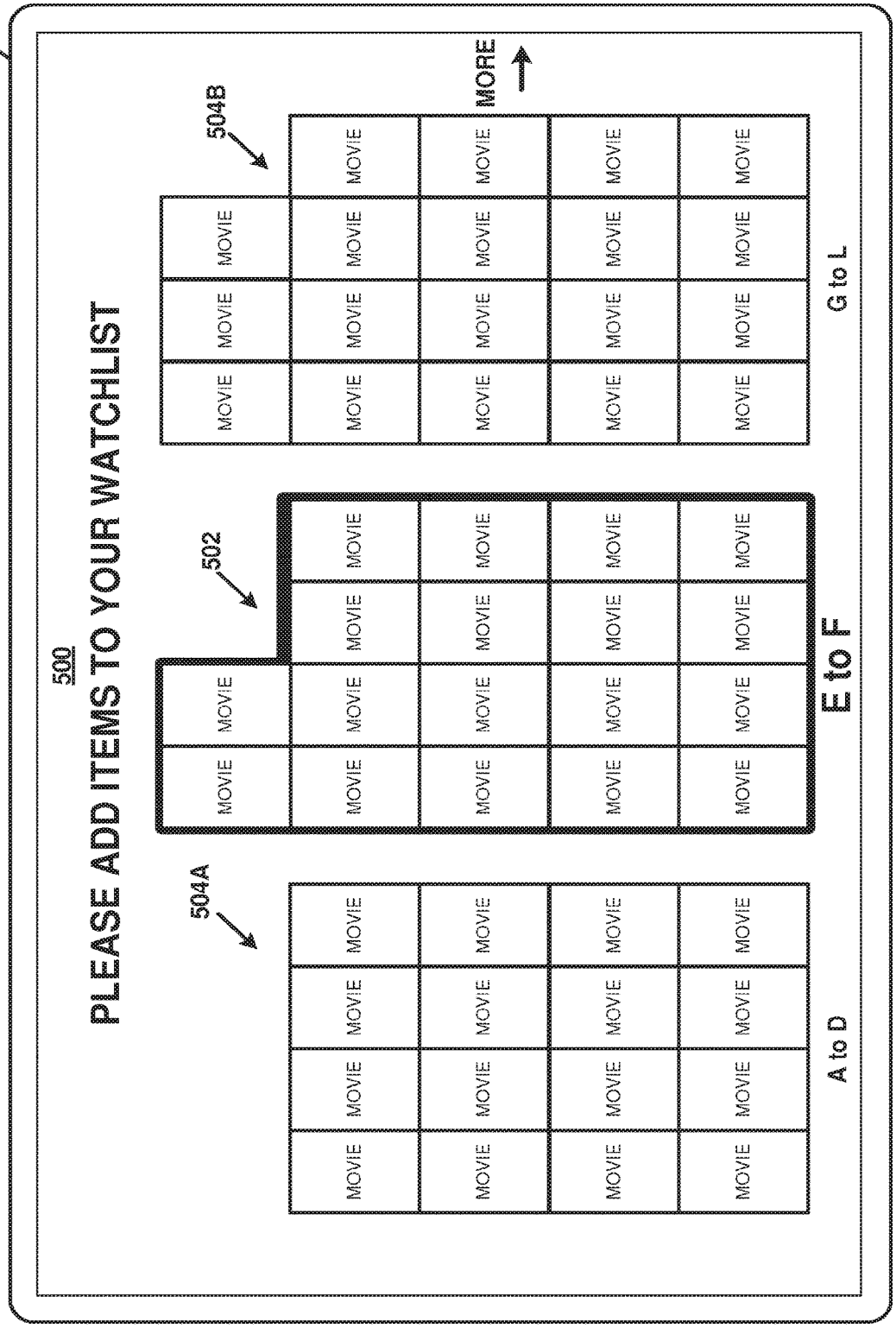

PLAN ONE ACCEPTED: 8 MOVIES FOR $19.97

SUBSCRIBE TO NETFLIX TO Watch Hot Rod, 48 HRS., TWINS, BraveHeart, and Total Recall for $9.99.

LAUNCH VUDU TO Watch TAK3N for $4.99, and Unbroken for $4.99.

LAUNCH CRACKLE TO Watch Donnie Brasco for Free

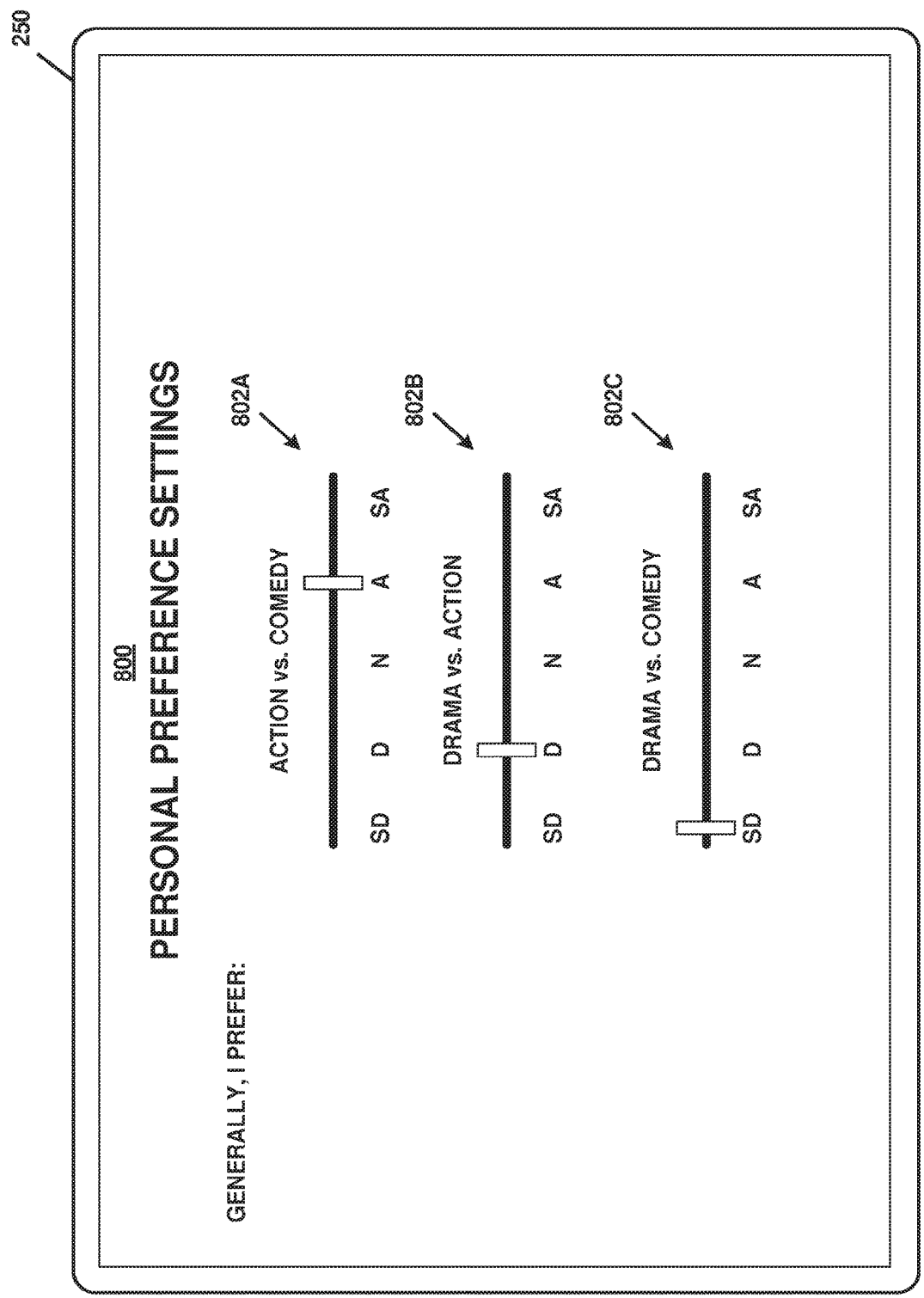

ns and methods for enabling a user to generate a plan to access content using multiple content services

CROSS-REFERENCE TO RELATED APPLICATIONS

This application is a continuation of U.S. patent application Ser. No. 15/882,560, filed on Jan. 29, 2018 and issued on Nov. 27, 2018 as U.S. Pat. No. 10,142,695, which is a continuation of U.S. patent application Ser. No. 14/840,785, filed on Aug. 31, 2015 and issued on Jan. 30, 2018 as U.S. Pat. No. 9,883,245. The contents of the above applications are incorporated herein by reference in their entireties.

TECHNICAL FIELD

The present disclosure relates to the field of interactive television and graphical user interfaces.

BACKGROUND

Digital media playback capabilities may be incorporated into a wide range of devices, including digital televisions, including so-called "smart" televisions, set-top boxes, laptop or desktop computers, tablet computers, e-book readers, digital recording devices, digital media players, video gaming devices, digital cameras, cellular phones, including so-called "smart" phones, and dedicated video streaming devices. Digital media content may originate from a plurality of sources including, for example, over-the-air television providers, satellite television providers, cable television providers, and online media-sharing services, including, online media streaming and downloading services. Further, devices with digital media playback capabilities may provide a user with interfaces, including graphical user interfaces (GUIs), that enable the user to select an item of content.

Due to the wide range of content users may access on devices with digital media playback capabilities, traditional interfaces and current techniques for organizing, sorting, and displaying available items of content may be less than ideal. Traditional interfaces and current techniques may be less than ideal when a user wishes to access a particular item of digital media content from one of a plurality potential sources.

SUMMARY

The following brief summary is not intended to include all features and aspects of the present invention, nor does it imply that the invention must include all features and aspects discussed in this summary. The present disclosure relates to techniques for enabling users to access digital media content and more specifically describes techniques and tools for enabling a user to efficiently access items of content. It should be noted that as used herein the term item of content may at least include individual items of digital content (e.g., video files, music files, digital images, etc.), and collections of individual items of digital content (e.g., a television series, an album of music files, an album of digital images, etc.). In some examples, the techniques described herein may be implemented in a device with digital media playback capabilities, including, for example, set-top boxes, televisions, laptop or desktop computers, gaming consoles, dedicated streaming devices, and/or an associated companion device, including, for example, remote controllers, tablet computers, and smart phones. It should be noted that in some instances the techniques described herein may be generally be applicable to devices capable of displaying graphical user interfaces and rendering digital content.

According to one example of the disclosure, a method of facilitating access to items of content comprises presenting a graphical user interface enabling a user to set constraints with respect to accessing items of content, providing a graphical user interface enabling a user to define a subset of items of content from a set of items of content, receiving one or more access plans based at least in part on the constraints and the subset of items of content, and presenting a graphical user interface enabling a user to accept one of the one or more access plans.

According to another example of the disclosure, a device for facilitating access to items of content comprises one or more processors configured to present a graphical user interface enabling a user to set constraints with respect to accessing items of content, provide a graphical user interface enabling a user to define a subset of items of content from a set of items of content, receive one or more access plans based at least in part on the constraints and the subset of items of content, and present a graphical user interface enabling a user to accept one of the one or more access plans.

According to another example of the disclosure, an apparatus for facilitating access to items of content comprises means for presenting a graphical user interface enabling a user to set constraints with respect to accessing items of content, means for providing a graphical user interface enabling a user to define a subset of items of content from a set of items of content, means for receiving one or more access plans based at least in part on the constraints and the subset of items of content, and means for presenting a graphical user interface enabling a user to accept one of the one or more access plans.

According to another example of the disclosure, a non-transitory computer-readable storage medium has instructions stored thereon that upon execution cause one or more processors of a device to present a graphical user interface enabling a user to set constraints with respect to accessing items of content, provide a graphical user interface enabling a user to define a subset of items of content from a set of items of content, receive one or more access plans based at least in part on the constraints and the subset of items of content, and present a graphical user interface enabling a user to accept one of the one or more access plans.

The details of one or more examples are set forth in the accompanying drawings and the description below. Other features, objects, and advantages will be apparent from the description and drawings, and from the claims.

BRIEF DESCRIPTION OF DRAWINGS

FIG. 5A-5B are conceptual diagrams illustrating an example graphical user interface that may implement one or more techniques of this disclosure.

FIG. 6A-6C are conceptual diagrams illustrating an example graphical user interface that may implement one or more techniques of this disclosure.

FIG. 8 is a conceptual diagram illustrating an example graphical user interface that may implement one or more techniques of this disclosure.

DETAILED DESCRIPTION

Figure 1:
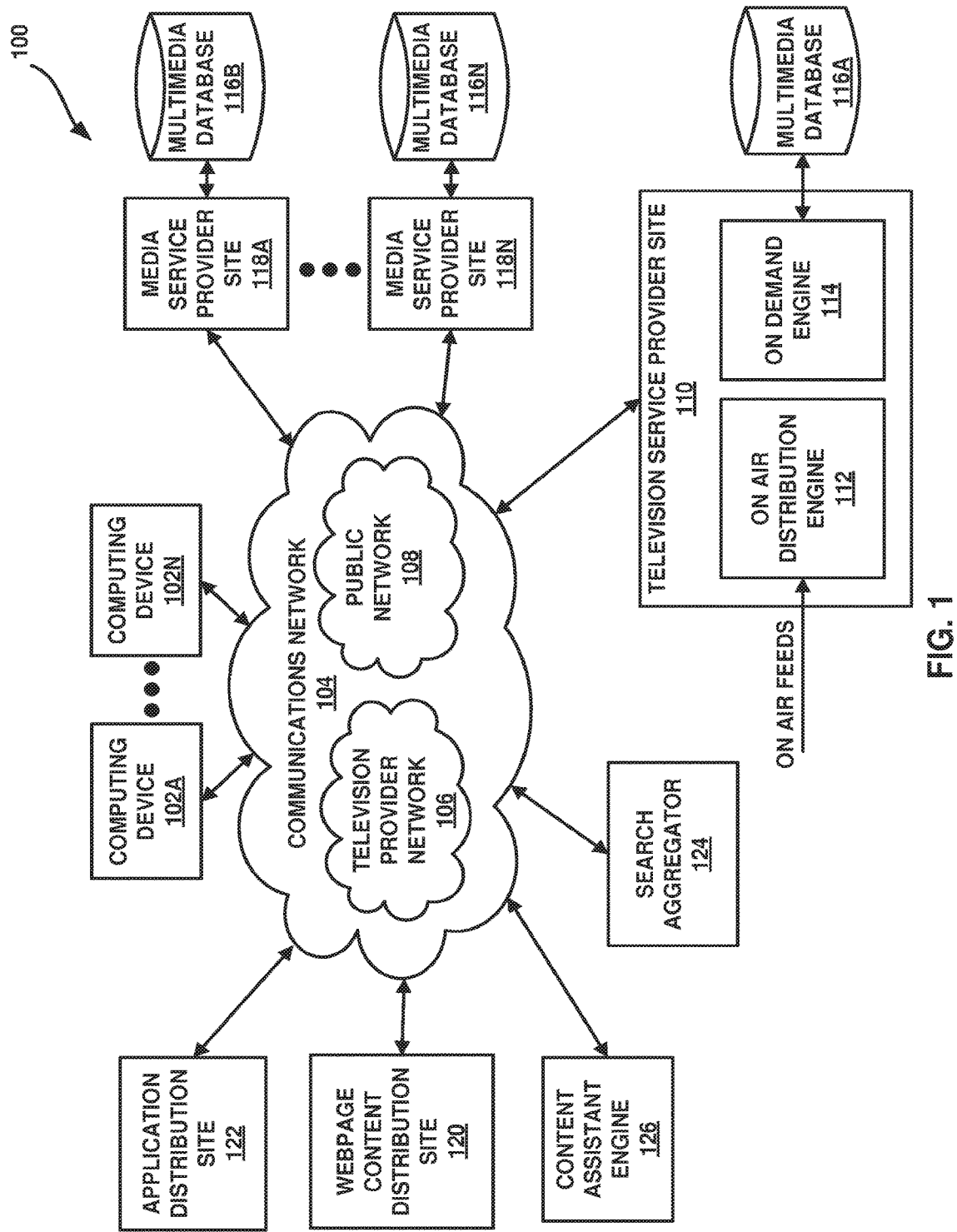
FIG. 1 is block diagram illustrating an example of a system that may implement one or more techniques of this disclosure.

Described herein are systems and methods for enabling a user to access items of content. Some embodiments extend to a machine-readable medium embodying instructions which, when executed by a machine, cause the machine to perform any one or more of the methodologies described herein. Other features will be apparent from the accompanying drawings and from the detailed description that follows. Examples merely typify possible variations. Unless explicitly stated otherwise, components and functions are optional and may be combined or subdivided, and operations may vary in sequence or may be combined or subdivided. In the following description, for purposes of explanation, numerous specific details are set forth to provide a thorough understanding of example embodiments. It will be evident to one skilled in the art, however, that the present subject matter may be practiced without these specific details.

Devices with digital media playback capabilities may enable a user to access items of content from diverse sources. For example, devices with digital media playback capabilities, including, for example, televisions, set-top boxes, laptop or desktop computers, tablet computers, video gaming devices, smart phones, and dedicated video streaming devices may enable a user thereof to access digital media content through one or more digital media content services. Examples of digital media content services include streaming services, television services, and combinations thereof. Current commercial examples of streaming services include streaming services available from Amazon.com®, Inc., Crackle®, Inc., Hulu®, LLC, Netflix®, Inc., and VUDU®, Inc. Current commercial examples of combinations of television and streaming services include services available from the Comcast® Corporation, DirecTV®, LLC and Home Box Office®, Inc. It should be noted that as used herein the term digital media content services may include services available free of charge (e.g., an advertisement supported service), services available in exchange for a recurring fee (e.g., a monthly subscription fee), services available on a pay per use basis (e.g., a fee to access a particular item of content), and/or combinations thereof. Further, as used herein, digital media services may refer to any service providing users access to digital media content, regardless of a particular delivery mechanism.

The availability of particular items of content and the cost to access particular items of content varies for respective digital media services. For example, a cable television provider may provide a user access to a movie (e.g., via a television provider network and/or the Internet) for a 24 hour period for a cost of $5.99, a streaming service may provide a user access to the same movie for a 24 hour period for a cost of $3.99, these examples may be referred to as pay per use accessibility. Further, a subscription based streaming service may provide a user with unlimited access to the same movie as part of a monthly subscription fee (e.g., $9.99), an advertisement supported streaming service may provide a user with unlimited access to a lower quality version of the same movie including commercial interruptions for free, and/or another service may not provide a user access to the movie. It should be noted that in some examples, a service provider may provide a user with streaming services on an a la carte basis. That is, for example, a service provider may enable a user to subscribe to one or more television network (i.e., "channel") affiliated streaming services.

Digital media services may include respective search engines. That is, for example, digital media services may include a website enabling a user to search for items of content available through that particular service. In order for a user to determine the availability and accessibility of a particular item of content across multiple services, a user may perform searches for the particular item of content using respective search engines available on websites maintained by service providers. Performing multiple searches in this manner may be time consuming and inconvenient for a user. Further, the availability of particular items of content varies on a frequent basis. That is, for example, an item of content may be available through a service for a limited time. Thus, in some cases, in order for a user to accurately determine the availability and accessibility of a particular item of content across multiple services, a user may need to perform multiple searches using a web browser on a weekly or daily basis.

It should be noted that some websites may provide aggregate search results for multiple digital media services. That is, websites may present combined search results from multiple service search engines in response to a query for an item of content. A commercial example of a website including aggregate search results includes the Flixster™ website maintained by Flixster, Inc. Although, these websites may save a user time by enabling a user to avoid entering a search term into multiple websites, current websites that aggregate search results are less than ideal. For example, in some cases, devices with digital media playback capabilities may enable a user to access services using respective dedicated applications and may not support full web browsing capabilities. That is, a website with aggregate search capabilities may not be fully accessible on a device having digital media playback capabilities. Further, due to the frequent changes in content availability, as described above, in order for a user to accurately determine the availability and accessibility of a particular item of content across multiple services, a user may still need to perform searches on a frequent basis.

It may be desirable for a user of a device having digital media playback capabilities to schedule and/or plan how to access particular items of content for a given time period. For example, every Friday night during a month, a user may wish to watch a movie selected from set of movies that are of interest to a user (e.g., new releases, action/adventure, preferred director, Academy Award nominees, etc.). For example, a user may wish to watch four of the 17 Academy Award Best Picture Nominees from 2014 and 2015 during a month (e.g., one every Friday night). As described above, it may be difficult and time consuming for a user to accurately determine the availability and accessibility of a particular item of content across multiple services using current techniques. Further, it may be even more difficult and time consuming for a user to determine the availability and accessibility of particular items of content within a defined set of items of content across multiple services using current techniques.

Additionally, a user may have one or more constraints with respect to accessing particular items of content within a defined set of items of content. For example, a user may have a limited budget for accessing items of content (e.g., $9.99 a month), a user may have scheduling preferences (e.g., wishes to watch multiple movies during a holiday weekend), and/or a user may prioritize certain items of content within the defined set of items of content higher than others (e.g., has a preference for the most recent Academy Award Best Picture Nominees). The systems and techniques described herein may enable a user to define a set of items of content, set constraints with respect to accessing items of content, and receive a one or more content access plans. The systems and techniques described herein may improve current computer implemented techniques for accessing items of content by more efficiently presenting information to a user and/or more efficiently enabling a user to provide information to a computing system.

FIG. 1 is block diagram illustrating an example of a system that may implement one or more techniques described in this disclosure. System 100 may be configured to enable a user to access items of content in accordance with the techniques described herein. In the example illustrated in FIG. 1, system 100 includes one or more computing devices 102A-102N, communications network 104, television service provider site 110, one or more media service provider sites 118A-118N, webpage content distribution site 120, application distribution site 122, search aggregator 124, and content assistant engine 126. System 100 may include software modules operating on one or more servers. Software modules may be stored in a memory and executed a processor. Servers may include one or more processors and a plurality of internal and/or external memory devices. Examples of memory devices include file servers, file transfer protocol (FTP) servers, network attached storage (NAS) devices, local disk drives, or any other type of device or storage medium capable of storing data. Storage media may include Blu-ray discs, DVDs, CD-ROMs, flash memory, or any other suitable digital storage media. When the techniques described herein are implemented partially in software, a device may store instructions for the software in a suitable, non-transitory computer-readable medium and execute the instructions in hardware using one or more processors.

System 100 represents an example of a system that may be configured to allow digital content, such as, for example, music, videos, images, webpages, messages, voice communications, and applications, to be distributed to and accessed by a plurality of computing devices, such as computing devices 102A-102N. In the example illustrated in FIG. 1, computing devices 102A-102N may include any device configured to transmit data to and/or receive data from communication network 104. For example, computing devices 102A-102N may be equipped for wired and/or wireless communications and may include set-top boxes, digital video recorders, televisions, desktop, laptop, or tablet computers, gaming consoles, mobile devices, including, for example, "smart" phones, cellular telephones, and personal gaming devices. It should be noted that although example system 100 is illustrated as having distinct sites, such an illustration is for descriptive purposes and does not limit system 100 to a particular physical architecture. Functions of system 100 and sites included therein may be realized using any combination of hardware, firmware and/or software implementations.

Communications network 104 may comprise any combination of wireless and/or wired communication media. Communications network 104 may include coaxial cables, fiber optic cables, twisted pair cables, wireless transmitters and receivers, routers, switches, repeaters, base stations, or any other equipment that may be useful to facilitate communications between various devices and sites. Communications network 104 may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards institute (ETSI) standards. Internet Protocol (IP) standards, Wireless Application Protocol (WAP) standards, and IEEE standards, such as, for example, one or more of standards included in the IEEE 802 family of standards.

As illustrated in FIG. 1, networks of different types may be defined within communications network 104. Networks may be defined according to physical and/or logical aspects. For example, networks that share the same physical infrastructure (e.g., coaxial cables) may be distinguished based on a primary service type (e.g., webpage access or television service) or communications protocols (e.g., IP/TCP or MPEG-TS). In the example illustrated in FIG. 1, communications network 104 includes television provider network 106 and public network 108. It should be noted that although television provider network 106 and public network 108 are illustrated as distinct, television provider network 106 and public network 108 may share physical and/or logical aspects.

Television provider network 106 is an example of a network configured to provide a user with television services. For example, television provider network 106 may include public over-the-air television networks, public or subscription-based satellite television service provider networks, and public or subscription-based cable television provider networks. It should be noted that although in some examples television provider network 106 may primarily be used to provide television services, television provider network 106 may also provide other types of data and services according to any combination of the telecommunication protocols described herein.

Public network 108 is an example of a packet-based network, such as, a local area network, a wide-area network, or a global network, such as the Internet, configured to provide a user with World Wide Web based services. Public network 108 may be configured to operate according to Internet Protocol (IP) standards. It should be noted that although in some examples public network 108 may primarily be used to provide access to hypertext web pages, public network 108 may also provide other types of media content according to any combination of the telecommunication protocol described herein.

Referring again to FIG. 1, television service provider site 110 may be configured to provide computing devices 102A-102N with television service. For example, television service provider site 110 may include a public broadcast station, a cable television provider, or a satellite television provider and may be configured to provide television services to analog and/or digital televisions and set-top boxes. In the example illustrated in FIG. 1, television service provider site 110 includes on air distribution engine 112 and on demand engine 114. On air distribution engine 112 may be configured to receive a plurality of on air feeds and distribute the feeds to computing devices 102A-102N through television provider network 106. For example, on air distribution engine 112 may be configured to receive one or more over-the-air television broadcasts via a satellite uplink/downlink and distribute the over-the-air television broadcasts to one or more users of a subscription-based cable television service.

On demand engine 114 may be configured to access a library of multimedia content and distribute multimedia content to one or more of computing devices 102A-102N through television provider network 106. For example, on demand engine 114 may access multimedia content (e.g., music, movies, and TV shows) stored in multimedia database 116A and provide a subscriber of a cable television service with movies on a Pay Per View (PPV) basis. For example, a user may purchase access to an item of content for a limited period (e.g., 24 hour access to a movie for $4.99). Multimedia database 116A may include storage devices configured to store multimedia content. It should be noted that multimedia content accessed through on demand engine 114 may also be located at various sites within system 100 (e.g., peer-to-peer distribution).

Media service provider sites 118A-118N represent examples of multimedia service providers. Media service provider sites 118A-118N may be configured to access a library of multimedia content and distribute multimedia content to one or more of computing devices 102A-102N through public network 108. For example, media service provider sites 118A-118N may access multimedia (e.g., music, movies and TV shows) stored in multimedia databases 116B-116N and provide a user of a media service with multimedia. Multimedia databases 116B-116N may include storage devices configured to store multimedia content. In one example, a media service provider site may be configured to provide content to one or more of computing devices 102A-102N using the Internet protocol suite. In some examples, a media service may be referred to as a streaming service. Commercial examples of streaming services are described above and may also include television network based streaming services (e.g., movies available from a Tuner Broadcasting Corporation website through a cable television subscription). As described above, television provider network 106 and public network 108 may share physical and logical aspects. Thus, content accessed by one or more of computing devices 102A-102N through a media service provider site 118A-118N may be transmitted through physical components of television provider network 106. For example, a user of one of computing devices 102A-102N may access the Internet and multimedia content provided by a media service through a cable modem connected to a coaxial network maintained by a cable television provider. Further, as described above, a media service may by associated with a search engine. Thus, in one example media service provider sites 118A-118N may include respective search engines enabling a user to search for items of content available on multimedia databases 116B-116N.

Webpage content distribution site 120 represents an example of a webpage service provider. Webpage content distribution site 120 may be configured to provide hypertext based content to one or more of computing devices 102A-102N through public network 108. It should be noted that hypertext based content may include audio and video content. Hypertext content may be defined according to programming languages, such as, for example, Hypertext Markup Language (HTML), Dynamic HTML, and Extensible Markup Language (XML). Examples of webpage content distribution sites include the United States Patent and Trademark Office website. As described above, digital media services may be associated with a website enabling a user to search for items of content accessible through that particular service. Webpage content distribution site 120 may include a website including a search engine associated with a digital media content services.

Application distribution site 122 represents an example of an application distribution service. Application distribution site 122 may be configured to distribute developed software applications to one or more of computing devices 102A-102N. In one example, software applications may include games and programs operable on computing devices. In other examples, software applications may be configured to allow a computing device to access content provided by a webpage content distribution site in manner specific to the computing device. For example, software applications may be configured to provide enhanced or reduced functionality of a webpage to a mobile device or a set-top box. In one example, a software application may enable a user to access a media service on a particular device. For example, a software application may enable a user to access a streaming service using a gaming console.

Software applications may be developed using a programming language. Examples of programming languages include, Java™, C, C++, Perl, UNIX Shell®, Visual Basic®, and Visual Basic® Script. In some examples, developers may write software applications using a software development kit (SDK) provided by a device manufacturer or a service provider. In the example where one or more of computing devices 102A-102N are mobile devices, application distribution site 122 may be maintained by a mobile device manufacturer, a service provider, and/or a mobile device operating system provider. In the example where one or more of computing devices 102A-102N are set-top boxes, application distribution site 122 may be maintained by a set-top box manufacturer, a service provider, and/or an operating system provider. In some examples, an application distribution site may be referred to as an app store. Examples of commercially available application distribution sites include sites maintained by Google®, Inc., Apple®, Inc., BlackBerry®, Inc., Microsoft®, Inc., and Amazon.com®, Inc.

Referring again to FIG. 1, search aggregator 124 represents an example of a system configured to perform plurality of queries and generate aggregated results. Content assistant engine 126 represents an example of a system configured to receive user constraints, receive a subset of items of content, and generate access plans. As described above, functions of system 100 and sites included therein may be realized using any combination of hardware, firmware and/or software implementations. Thus, elements of the techniques described herein may be distributed throughout system 100. For example, one or more functions respectively described as being performed by of search aggregator 124 and content assistant engine 126 may be performed using hardware, firmware, and/or software included as part of a computing device 102A-102N and/or may be performed using hardware, firmware, and/or software included as part of a distinct site. The distribution of elements of the techniques described herein may be based on the capabilities of a computing device. For example, a computing device with relatively limited processing capabilities may perform fewer elements of a technique than a computing device with relatively higher processing capabilities.

Figure 2A:
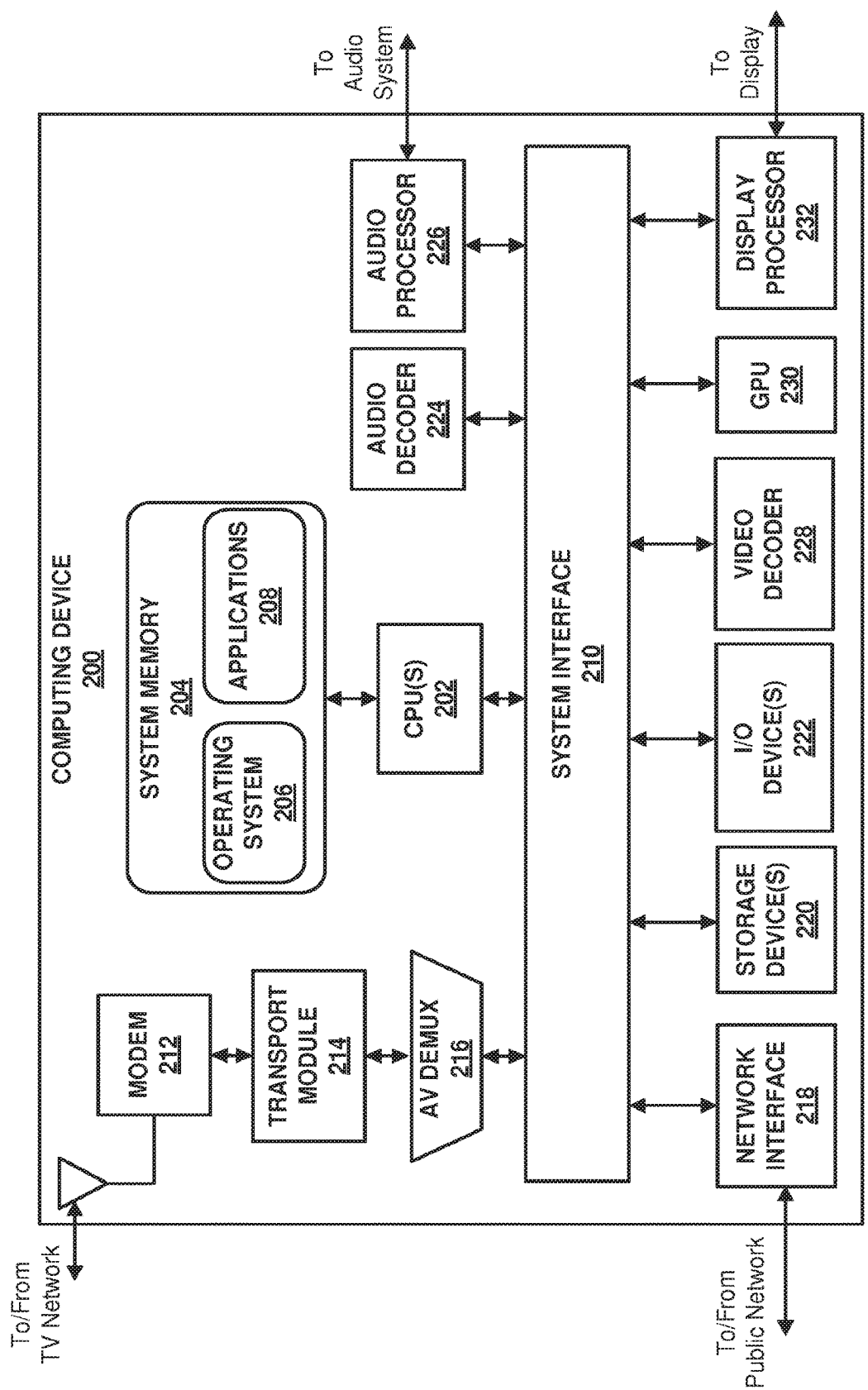
FIG. 2A is a block diagram illustrating an example of a computing device that may implement one or more techniques of this disclosure.

FIG. 2A is a block diagram illustrating an example of a computing device that may implement one or more techniques of this disclosure. Computing device 200 is an example of a computing device that may be configured to transmit data to and receive data from a communications network, allow a user to access multimedia content, and execute one or more applications. Computing device 200 may include or be part of a stationary computing device (e.g., a desktop computer, a television, a set-top box, a gaming console, a dedicated multimedia streaming device, or a digital video recorder), a portable computing device (e.g., a mobile phone, a laptop, a personal data assistant (PDA), or a tablet device) or another type of computing device. In the example illustrated in FIG. 2A, computing device 200 is configured to send and receive data via a television network, such as, for example, television network 106 described above and send and receive data via a public network, such as, for example, public network 108. It should be noted that in other examples, computing device 200 may be configured to send and receive data through one of a television network 106 or a public network 108. The techniques described herein may be utilized by devices configured to communicate using any and all combinations of communications networks.

As illustrated in FIG. 2A, computing device 200 includes central processing unit(s) 202, system memory 204, system interface 210, modem 212, transport module 214, AV demux 216, network interface 218, storage devices 220. I/O devices 222, audio decoder 224, audio processor 226, video decoder 228, graphics processing unit 230, and display processor 232. As illustrated in FIG. 2A, system memory 204 includes operating system 206 and applications 208. Each of processor(s) 202, system memory 204, system interface 210, modem 212, transport module 214, AV demux 216, network interface 218, storage devices 220. I/O devices 222, audio decoder 224, audio processor 226, video decoder 228, graphics processing unit 230, and display processor 232 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although example computing device 200 is illustrated as having distinct functional blocks, such an illustration is for descriptive purposes and does not limit computing device 200 to a particular hardware architecture. Functions of computing device 200 may be realized using any combination of hardware, firmware and/or software implementations.

CPU(s) 202 may be configured to implement functionality and/or process instructions for execution in computing device 200. CPU(s) 202 may be capable of retrieving and processing instructions, code, and/or data structures for implementing one or more of the techniques described herein. Instructions may be stored on a computer readable medium, such as system memory 204 or storage devices 220. CPU(s) 202 may include multi-core central processing units.

System memory 204 may be described as a non-transitory or tangible computer-readable storage medium. In some examples, system memory 204 may provide temporary and/or long-term storage. In some examples, system memory 204 or portions thereof may be described as non-volatile memory and in other examples portions of system memory 204 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories.

System memory 204 may be configured to store information that may be used by computing device 200 during operation. System memory 204 may be used to store program instructions for execution by CPU(s) 202 and may be used by software or applications running on computing device 200 to temporarily store information during program execution. For example, system memory 204 may store instructions associated with operating system 206 and applications 208. Applications 208 may include applications implemented within or executed by computing device 200 and may be implemented or contained within, operable by, executed by, and/or be operatively/communicatively coupled to components of computing device 200. Applications 208 may include instructions that may cause CPU(s) 202 of computing device 200 to perform particular functions. Applications 208 may include algorithms which are expressed in computer programming statements, such as, for-loops, while-loops, if-statements, do-loops, etc. Applications 208 may be distributed to computing device 200 through an application distribution site, for example, application distribution site 122, in one example, applications 208 may cause computing device 200 to perform functions associated with the example techniques described herein that enable a user to access items of content. Applications 208 may cause one or more graphical user interfaces that enable a user to provide data for use by an application. In one example, applications 208 may include one or more dedicated applications enabling a user to access a digital media service. Further, applications 208 may perform functions associated with any component of a search aggregator and/or any component of a content assistant engine. In one example, applications 208 may include a dedicated content assistant application.

As further illustrated in FIG. 2A, applications 208 may execute in conjunction with operating system 206. That is, operating system 206 may be configured to facilitate the interaction of applications 208 with CPUs(s) 202, and other hardware components of computing device 200. It should be noted that in some examples, components of operating system 206 and components acting in conjunction with operating system 206 may be referred to as middleware. The techniques described herein may be utilized by devices configured to operate using any and all combinations of software architectures. Operating system 206 may be an operating system designed to be installed on laptops, desktops, smartphones, tablets, set-top boxes, digital video recorders, televisions and/or gaming devices. In one example, operating system 206 may include one or more of operating systems or middleware components developed by OpenTV®, Windows® operating systems, Linux operation systems, Mac OS®, Android® operating systems, and any and all combinations thereof.

System interface 210 may be configured to enable communications between components of computing device 200. In one example, system interface 210 comprises structures that enable data to be transferred from one peer device to another peer device or to a storage medium. For example, system interface 210 may include a chipset supporting Accelerated Graphics Port (AGP) based protocols, Peripheral Component Interconnect (PCI) bus based protocols, such as, for example, the PCI Express™ (PCIe) bus specification, which is maintained by the Peripheral Component Interconnect Special Interest Group, or any other form of structure that may be used to interconnect peer devices.

Storage devices 220 represent memory of computing device 200 that may be configured to store relatively larger amounts of information for relatively longer periods of time than system memory 204. For example, in the example where computing device 200 is included as part of a digital video recorder, storage devices 220 may be configured to store numerous video files. Similar to system memory 204, storage device(s) 220 may also include one or more non-transitory or tangible computer-readable storage media. Storage device(s) 220 may include internal and/or external memory devices and in some examples may include volatile and non-volatile storage elements.

I/O devices 222 may be configured to receive input and provide output during operation of computing device 200. Input may be generated from an input device, such as, for example, a push-button remote control, a motion based remote control, a device including a touch-sensitive screen, a device including a track pad, a mouse, a keyboard, a microphone, a video camera, a motion sensor, or any other type of device configured to receive user input. In one example, an input device may include an advanced user input device, such as a smart phone or a tablet computing device. For example, an input device may be a secondary computing device and may be configured to receive user input via touch gestures, buttons on the secondary computing device, and/or voice control. Further, in some examples, an input device may include a display that is configured to display the graphical user interfaces described herein. For example, in the case where computing device 200 includes a television, an input device may include a smart phone in communication with the television. In this example, a user may provide commands to a television by activating portions of a graphical user interface displayed on a smart phone. The graphical user interface displayed on the smart phone may be a replica or an extension of a graphical user interface displayed on the television, Output may be provided to output devices, such as, for example internal speakers, an integrated display device, and/or external components, such as, a secondary computing device. In some examples, I/O device(s) 222 may be operatively coupled to computing device 200 using a standardized communication protocol, such as for example. Universal Serial Bus protocol (USB), Bluetooth, ZigBee or a proprietary communications protocol, such as, for example, a proprietary infrared communications protocol.

Figure 2B:
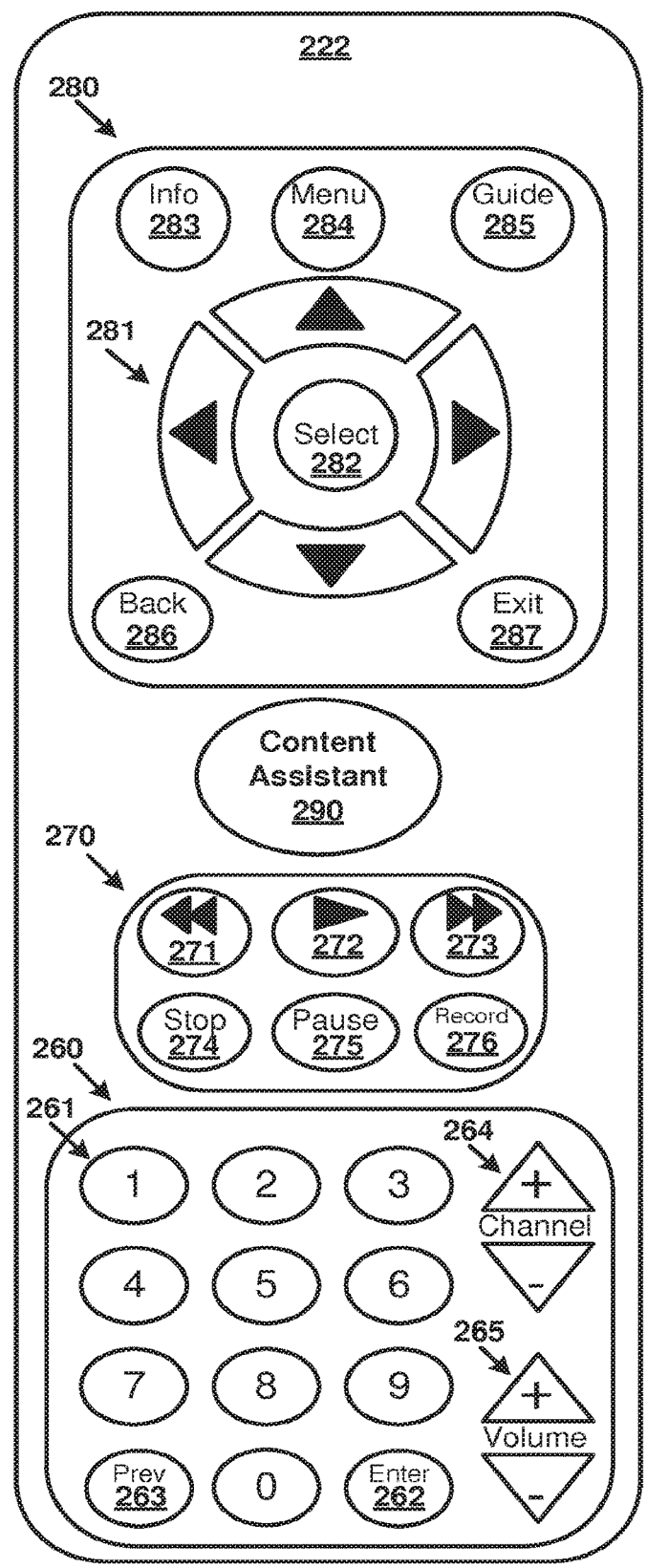
FIG. 2B is a conceptual diagram illustrating an example of an input/output device that may implement one or more techniques of this disclosure.

FIG. 2B is a conceptual diagram illustrating an example of an input/output device that may implement one or more techniques of this disclosure. In the example illustrated in FIG. 2B, I/O device 222 is illustrated as a push-button remote control. It should be noted that while I/O device 222 is illustrated as a push-button remote control in the example illustrated in FIG. 2B, in other examples, the functionality of I/O device 222 may be implemented using other types of I/O devices, such as, for example, a secondary computing device in communication with a primary computing device. Further, in other examples, functions achieved by activation of buttons of I/O device 222 may be achieved through other types of user inputs. For example, in the case where an I/O device includes a touchscreen, gesture recognition, and/or voice recognition, virtual buttons may be presented on the touchscreen and functions achieved by activation of buttons on I/O device 222 may be achieved through any and all combinations of virtual button activation, motion gestures, and/or voice commands. In one example, an I/O device may have voice recognition capabilities and a function achieved by activation of content assistant button 290 may be achieved by a user saying "Assist," or a similar phrase.

In the example illustrated in FIG. 2B, I/O device 222 includes basic television controls 260, playback controls 270, navigational controls 280, and content assistant button 290. Basic television controls 260 may be configured to enable a user to perform basic tuning and volume control functions associated with viewing television programming. As illustrated in FIG. 2B, basic television controls 260 include numeric keypad 261, enter button 262, previous channel button 263, channel change buttons 264, and volume control buttons 265. Numeric keypad 261, enter button 262, previous channel button 263, and channel change buttons 264 may be configured to enable a user to tune to a particular analog and/or digital channel. Upon a user entering a sequence of numbers using numeric keypad 261 and, optionally, additionally activating enter key 262, a tuner may tune to a specified channel. Upon activation of previous channel button 263, a tuner may tune to a previously tuned channel. Activation of "+" and "−" channel buttons 264 may respectively cause a tuner to tune to the respective next channel in a sequence of channels. Activation of "+" and "−" volume control buttons 265 may respectively cause the output of an audio system to be increased or decreased. It should be noted that although the basic television controls 260 may be configured to enable a user to perform basic tuning and volume control functions associated with a television, in some examples, basic television controls 260 may be used to perform other functions associated with a computing device.

Playback controls 270 may be configured to enable a user to control the playback of and/or record multimedia content. For example, playback controls 270 may enable a user to control the playback of a video originating from a media service provider site, an on demand engine, and/or a personal video recorder (PVR). As illustrated in FIG. 2B, playback controls 270 include reverse playback button 271, normal playback button 272, forward playback button 273, stop playback button 274, pause playback button 275, and record button 276. Reverse playback button 271 may enable to a user to navigate to a previous point in a multimedia sequence. Upon activation, normal playback button 272 may cause normal playback of an item of multimedia content to begin or resume. Forward playback button 273 may enable a user to navigate to a future point in a multimedia sequence. Upon activation, stop playback button 274 may cause the playback of an item of multimedia content to cease. Upon activation, pause playback button 275 may cause the playback of an item of multimedia content to be paused. Record button 276 may enable a user to cause an item of multimedia content to be stored to a storage device. In one example, record button 276 may enable a user to record content to a storage device. It should be noted that although playback controls 270 may be configured to enable a user to control the playback of and/or record multimedia content, in some examples playback controls 270 may be used to perform other functions associated with a computing device.

As described above, devices with digital media playback capabilities, including, for example, televisions, set top boxes, and mobile devices, may be configured to provide users thereof with graphical user interfaces that enable the selection of content. Navigational controls 280 may be configured to enable a user to navigate graphical user interfaces and select content using a graphical user interface. In one example, navigational controls 280 may be configured to enable a user to navigate graphical user interfaces and access items of content according to the techniques described herein.

In the example illustrated in FIG. 2B, navigational controls 280 include navigational arrow buttons 281, select button 282, information button 283, menu button 284, guide button 285, back button 286, and exit button 287. Navigational arrow buttons 281 may be configured to move the position of a cursor associated with a graphical user interface and/or change the selection of an item included in a graphical user interface. Select button 282 may enable a user to further select an icon. In one example, consecutive activations of select button 282 may cause respective levels of selection to occur. Information button 283 may be configured to cause additional information associated with an item of content of to be displayed. For example, when an icon representing an item of content is initially selected, activation of information button 283 may cause information associated with the content (e.g., cast and crew information) to be displayed.

Menu button 284, guide button 285, back button 286, and exit button 287 may be configured to enable a user to cause different graphical user interfaces to be presented. Upon activation, menu button 284 may cause a graphical user interface including a high level menu to be displayed. In one example, a high level menu may include a menu that enables a user to change settings associated with the operation of a computing device. In one example, a high-level menu may include a menu that enables a user to select a user profile (e.g., a log-in graphical user interface). Upon activation, guide button 285 may be configured to provide a graphical user interface that enables a user to select content. In one example, upon activation of guide button 285, a graphical user interface including a grid guide may be presented to a user. Back button 286 may be configured to enable a user to return to a previous graphical user interface. Exit button 287 may be configured to enable a user to return to a full screen viewing mode. For example, when a graphical user interface is displayed, upon activation of exit button 287, the graphical user interface may disappear" and full screen content viewing mode may be presented to a user.

As described above, applications 208 may cause computing device 200 to perform functions associated with the example techniques described herein that enable a user to access items of content. Content assistant button 290 may cause computing device 200 to initiate execution of an application that causes computing device 200 to perform functions associated with the example techniques described herein. That is, content assistant button 290 may launch a content assistant application. As described in detail below a content assistant application may cause one or more graphical user interfaces to be presented. Examples of graphical user interfaces are described in detail below with respect to FIGS. 4-6C.

Referring again to FIG. 2A, computing device 200 is configured to send and receive data via a television network, such as, for example, television network 106 described above and send and receive data via a public network, such as, for example, public network 108. A communications network may be described based on a model including layers that define communication properties, such as, for example, physical signaling, addressing, channel access control, packet properties, and data processing in a communications system. In the example illustrated in FIG. 2A, modem 212, transport module 214, and AV demux 216 may be configured to perform lower layer processing associated with television network 106 and network interface 218 may be configured to perform lower layer processing associated with public network 108.

In one example, modem 212 may be configured to perform physical signaling, addressing, and channel access control according to the physical and MAC layers utilized in a television provider network, such as, for example, television provider network 106. In one example, modem 212 may configured to receive signals from a coaxial cable and/or an over-the-air signal and perform low level signal processing (e.g., demodulation). In one example, modem 212 may be configured to extract transport streams from signals received from a coaxial cable. In one example, a transport stream may be based on a transport stream defined by the Moving Pictures Experts Group (MPEG). In one example, a transport stream may include a plurality of program streams where each program stream respectively corresponds to a program available from a television network. Further, a transport stream may include a plurality of data streams (e.g., Program Map Table and EPG data).

Transport module 214 may be configured to receive data from modem 212 and process received data. For example, transport model 214 may be configured to receive a transport stream including a plurality of program streams and extract individual program streams from a received transport stream. In one example, a program stream may include a video stream, an audio stream, and a data stream. AV demux 216 may be configured to receive data from transport module 214 and process received data. For example, AV demux 216 may be configured to receive a program stream from transport module 214 and extract audio packets, video packets, and data packets. That is, AV demux 216 may apply demultiplexing techniques to separate video streams, audio streams, and data streams from a program stream. In one example, AV demux 216 may be configured to decapsulate packetized elementary video and audio streams from a transport stream defined according to MPEG-2 Part 1. It should be noted that although modem 212, transport module 214, and AV demux 216 are illustrated as distinct functional blocks, the functions performed by modem 212, transport module 214, and AV demux 216 may be highly integrated and realized using any combination of hardware, firmware and/or software implementations.

Network interface 218 may be configured to enable computing device 200 to send and receive data via a public network. As described above, data sent or received via a public network may include data associated digital content, such as, for example, music, videos, images, webpages, messages, voice communications, and applications. Network interface 218 may include a network interface card, such as an Ethernet card, an optical transceiver, a radio frequency transceiver, or any other type of device configured to send and receive information. Network interface 218 may be configured to perform physical signaling, addressing, and channel access control according to the physical and MAC layers utilized in a public network, such as, for example, public network 108. Further, in a manner similar to that described above with respect to transport module 214 and AV demux 216, network interface 218 may be configured to extract audio packets, video packets, and data packets from a data stream. For example, network interface 218 may be configured to extract video packets, audio packets, and data packets according to one or more of internet protocol (IP), transport control protocol (TCP), real time streaming protocol (RTSP), user datagram protocol (UDP), real time protocol (RTP), MPEG transport stream protocols, and IPTV protocols. It should be noted, that the techniques described herein are generally applicable to any and all methods of digital content distribution and are not limited to particular communications network implementations. For example, the techniques described herein may be applicable to digital content originating from one or more of a broadcast, a multicast, a unicast, an over-the-top content source, a personal video recorder (PVR), and a peer-to-peer content source.

Referring again to FIG. 2A, data associated with digital content, such as, for example, music, videos, images, webpages, messages, voice communications, and applications may be stored in a computer readable medium, such as, for example, system memory 204 and storage devices 220. Data stored in a memory device may be retrieved and processed by CPU(s) 202, audio decoder 224, audio processor 226, video decoder 228, graphics processing unit 230, and display processor 232. As described above, CPU(s) 202 may be capable of retrieving and processing instructions, code, and/or data structures for implementing one or more of the techniques described herein. Each of audio decoder 224, audio processor 226, video decoder 228, graphics processing unit 230, and display processor 232 may also be capable of retrieving and processing instructions, code, and/or data structures for implementing one or more of the techniques described herein.

Audio decoder 224 may be configured to retrieve and process coded audio data. For example, audio decoder 224 may be a combination of hardware and software used to implement aspects of audio codec. Audio data may be coded using multi-channel formats such as those developed by Dolby and Digital Theater Systems. Audio data may be coded using a compressed or uncompressed format. Examples of compressed audio formats include MPEG-1, 2 Audio Layers II and III, AC-3, AAC, and Ogg Vorbis. An example of an uncompressed audio format includes pulsecode modulation (PCM) audio format. Audio processor 226 may be configured to retrieve captured audio samples and may process audio data for output to an audio system (not shown). In some examples, audio processor 226 may include a digital to analog converter. An audio system may comprise any of a variety of audio output devices such as headphones, a single-speaker system, a multi-speaker system, or a surround sound system.

Video decoder 228 may be configured to retrieve and process coded video data. For example, video decoder 228 may be a combination of hardware and software used to implement aspects of video codec. In one example, video decoder 228 may be configured to decode video data encoded according to any number of video compression standards, such as ITU-T H.261, ISO/IEC MPEG-1 Visual, ITU-T H.262 or ISO/IEC MPEG-2 Visual. ITU-T H.263, ISO/IEC MPEG-4 Visual, ITU-T H.264 (also known as ISO/IEC MPEG-4 AVC), VP8, and High-Efficiency Video Coding (HEVC).

As described above, a device with media playback capabilities may provide a graphical user interface that enables a user to access items of content. A graphical user interface may include images and graphics displayed in conjunction with video content (e.g., playback icons overlaid on a video). Graphics processing unit 230 is an example of a dedicated processing unit that may be configured to generate graphical user interfaces, including the graphical user interfaces described herein. That is, graphics processing unit 230 may be configured to receive commands and content data and output pixel data. Graphic processing unit 230 may operate according to a graphics pipeline process (e.g., input assembler, vertex shader, geometry shader, rasterizer, pixel shader, and output merger). Graphics processing unit 230 may include multiple processing cores and may be configured to operate according to OpenGL (Open Graphic Library, managed by the Khronos Group) and/or Direct3D (managed by Microsoft. Inc.).

Display processor 232 may be configured to retrieve and process pixel data for display. For example, display processor 232 may receive pixel data from video decoder 228 and/or graphics processing unit 230 and output data for display. Display processor 232 may be coupled to a display, such as display 250 (not shown in FIG. 2A) using a standardized communication protocol (e.g., HDMI, DVI, DisplayPort, component video, composite video, and/or VGA). Display 250 may comprise one of a variety of display devices such as a liquid crystal display (LCD), a plasma display, an organic light emitting diode (OLED) display, or another type of display device capable of presenting video data to a user. Display 250 may include a standard definition television, a high definition television, or an ultra-resolution display as described above. Further, display 250 may include an integrated display of a portable computing device (e.g., a mobile phone, a laptop, a personal data assistant (PDA), or a tablet device). As described above, in some examples a portable computing device may operate as an I/O device for a stationary computing device.

As described above, using current techniques it may be difficult for a user of a device having digital media playback capabilities to determine the availability and accessibility of particular item of contents. Further, it may be even more difficult and time consuming for a user to determine the availability and accessibility of particular items of content within a defined set of items of content across multiple services using current techniques. Computing device 200 represents an example of a device that may be configured to present a graphical user interface enabling a user to set constraints with respect to accessing items of content, provide a graphical user interface enabling a user to define a subset of items of content from a set of items of content, generate one or more access plans based at least in part on the constraints and the subset of items of content, and present a graphical user interface enabling a user to accept one of the one or more access plans.

Figure 3:
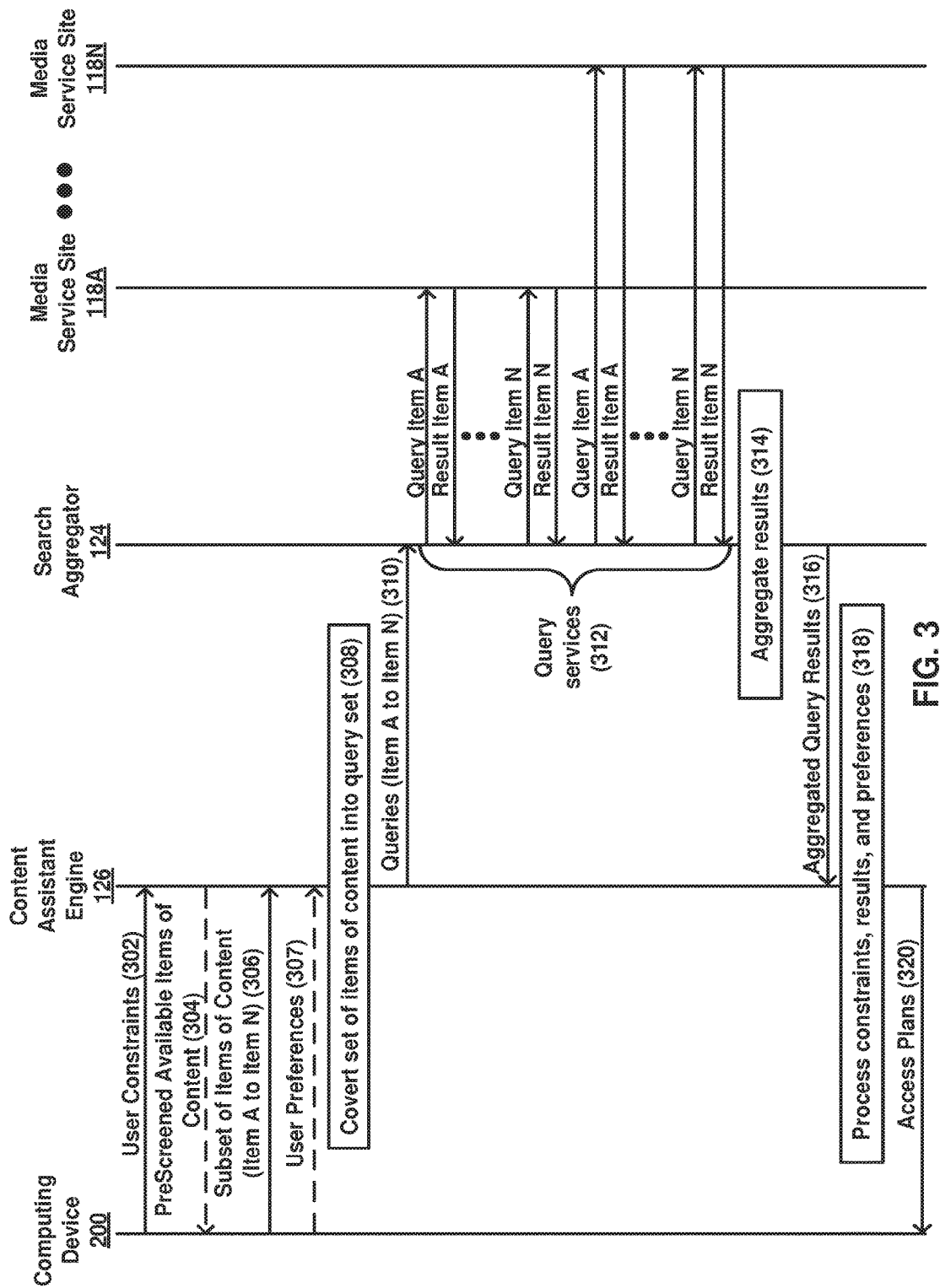
FIG. 3 is a conceptual communications flow diagram illustrating an example method for enabling a user to access items of content according to one or more of the techniques of this disclosure.

FIG. 3 is a conceptual communications flow diagram illustrating an example method for enabling a user to access items of content according to one or more of the techniques of this disclosure. It should be noted that although in the example illustrated in FIG. 3 communications are illustrated as occurring between distinct sites and functions are illustrated as occurring at particular sites, such an illustration is for descriptive purposes and does not limit the techniques described herein to a particular physical architecture. For example, content assistant engine 126 and/or search aggregator 124 may be implemented as a combination of hardware, firmware and/or software included as part of computing device 200.

Figure 4:
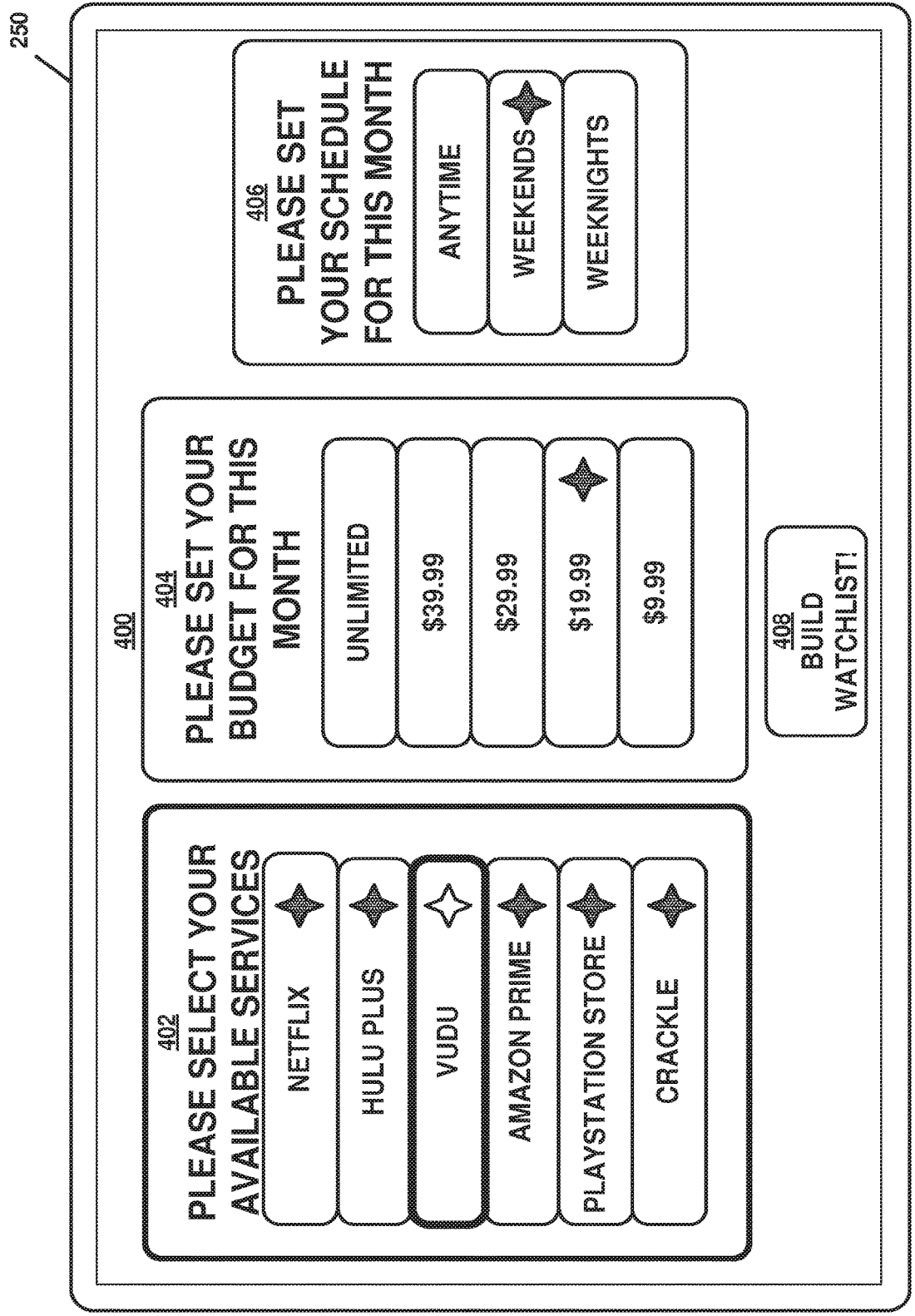
FIG. 4 is a conceptual diagram illustrating an example graphical user interface that may implement one or more techniques of this disclosure.

As described above, computing device 200 may cause one or more graphical user interfaces to be presented, for example, upon a user launching a content assistant application. Referring to FIG. 3, computing device 200 may be configured to receive information from a user through a graphical user interface and provide the information to content assistant engine 126. Further, computing device 200 may be configured to receive information from content assistant engine 126 and provide the information to a user through a graphical user interface. As illustrated in FIG. 3, computing device 200 provides user constraints to content assistant engine 126 (302). In one example, computing device 200 may be configured to provide a graphical user interface to a user that enables a user to provide user constraints. FIG. 4 illustrates an example of a graphical user interface that may be presented to a user that enables a user to provide user constraints.

In one example, graphical user interface 400 may to be presented to a user at the beginning of a viewing period, e.g., on a monthly or other subscription period basis. As such, the types of constraints included in graphical user interface 400 may correspond to constraints that are likely to change on a monthly basis. For example, if a user plans on traveling a particularly month, a user's budget and/or schedule may change. In the example illustrated in FIG. 4, graphical user interface 400 includes service constraint pane 402, budget constraint pane 404, and schedule constraint pane 406. Each of service constraint pane 402, budget constraint pane 404, and schedule constraint pane 406 may be selected by a user (e.g., using navigational control 280) and upon being selected, a user may specify particular constraints within the pane. In the example illustrated in FIG. 4, service constraint pane 402 is selected and a user may select icons representing potential services and select services that a user wishes to access items of content from. This may include services that are supported by a user's device and/or services a user currently has access or a subscription to. In the example illustrated in FIG. 4, all services except VUDU are selected. In a similar manner, a user may select a budget (e.g., $19.99), and a schedule, e.g., a preferred time for accessing items of content (e.g., weekends). In one example, a user may initially provide device information (e.g., identifying information for a digital television), credentials for current subscriptions (e.g., user names and passwords), and/or billing information (e.g., credit card information). In this manner, graphical user interface 400 may be customized based on information initially provided by a user. For example, if a user's device does not support a particular service, the service may not be included in service constraint pane 402.

Figure 7:
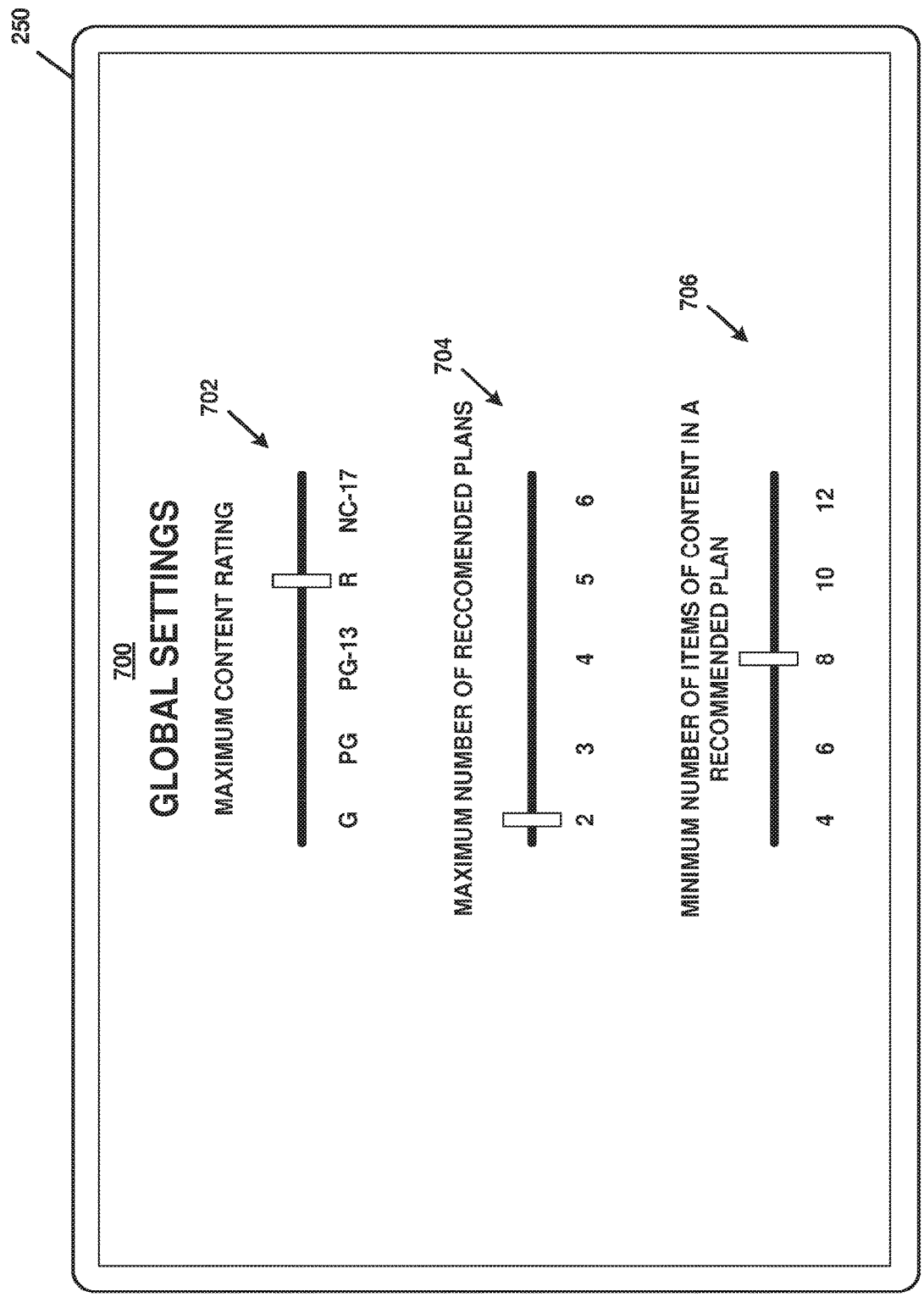
FIG. 7 is a conceptual diagram illustrating an example graphical user interface that may implement one or more techniques of this disclosure.

It should be noted that although, three types of constraint panes are illustrated in the example of FIG. 4, in other examples fewer or more types of constraints may be provided. For example, a user may provide constraints with respect to item of content ratings e.g., specifying that the user only wishes to access family friendly content). Further, additional graphical user interfaces enabling a user to set additional constraints may be provided by computing device 200. FIG. 7 illustrates an example of a graphical user interface that may be presented to a user that enables a user to provide user constraints. In the example, illustrated in FIG. 7, graphical user interface 700 may present a user with constraint types that are likely to change less frequently than those included in FIG. 4. For example, a family with children will likely want to limit access to mature content for an extended period of time.

In the example illustrated in FIG. 7, graphical user interface 700 includes maximum content rating slider bar 702, maximum number of recommended plans slider bar 704, and minimum number of movies in a recommended plan slider bar 706. Maximum content rating slider bar 702 enables a user to set the maximum rating of items of content that will be available in a recommended plan. As described in further detail below, this may cause a list of available items of content for selection to be filtered. Maximum number of recommended plans slider bar 704 may enable a user to set the number of plans that are presented to a user (e.g., presented in graphical user interface 600). For example, there may be dozens (or potentially more) plans that satisfy user criteria and a user may prefer to review and select a plan from a limited number of plans, e.g., 2-6. It should be noted that the number of plans that satisfy a user's constraints increases as a user's constraints are relaxed. For example, more potential plans may satisfy a user's constraints, if a user's budget is unlimited. As described in further detail below, content assistant engine 126 may rank plans according to one or more criteria (e.g., total number of items of content in plan, user preferences for types of content, etc.). Thus, when multiple plans satisfy a user's constraints, a limited number of the highest ranking plans may be presented.

Minimum number of items of content in a recommended plan slider bar 706 may enable a user to set the number of items of content required to be included in a plan for a plan to be available for selection (e.g., presented in graphical user interface 600). For example, a user may wish to consider plans having a threshold number of items of content. For example, a user may wish to subscribe to a service if the service includes at least two or more items of content. In this manner, additionally or alternatively, graphical user interface 700 may include an option to set a minimum number of items of content included in a subscription service slider bar. In this manner, graphical user interface 700 enables a user to set constraints with respect to potential items of content that may be included in a plan, set constraints with respect to the number of potential plans that are presented to the user for selection, and/or set constraints with respect to minimum criteria that are met for a plan to be presented for potential selection.

Referring again to FIG. 4, graphical user interface 400 includes build watchlist icon 408. A user may activate build watchlist icon 408 after a user has provided constraint information. Upon activation, build watchlist icon 408 may cause graphical user interface 500 illustrated in FIG. 5 to be presented. Further, referring again to FIG. 3, upon a user activating build watchlist icon 408, computing device 200 may provide user constraints to content assistant engine 126 (302). In the example illustrated in FIG. 3, after receiving user constraints, content assistant engine 126 provides a list of prescreened available items of content to computing device 200 (304). A list of prescreened available items of content may be generated based on received user constraints. For example, content assistant engine 126 may prescreen a complete list of available items of content to a smaller list based on services selected by a user, maximum content ratings, or the like. It should be noted that in other examples, a complete list of available items of content may be provided.

Figure 5B:
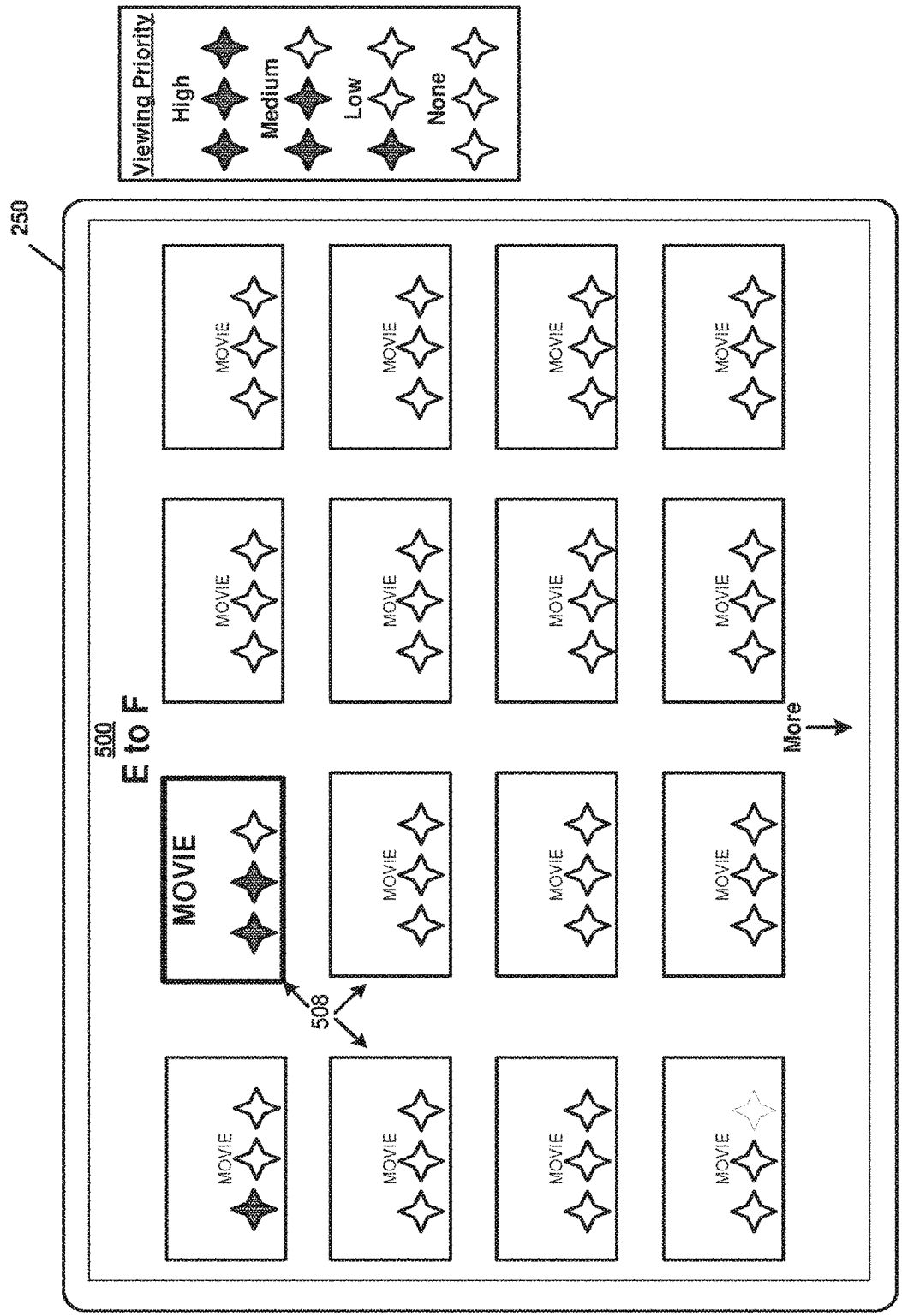

As illustrated in FIG. 3 computing device 200 provides a subset of items of content to content assistant engine 126 (306). In one example, computing device 200 may be configured to provide a graphical user interface that enables a user to provide a subset of items of content. FIGS. 5A-5B illustrate an example of a graphical user interface that may be presented to enable a user to provide a subset of items of content. In the example illustrated in FIG. 5A, graphical user interface 500 may be similar to graphical user interfaces described in commonly assigned, currently pending, U.S. patent application Ser. No. 14/336,758, filed Jul. 21, 2014, which is hereby incorporated by reference in its entirety. In another example, a graphical user interface that may be presented to a user to enable a user provide a subset of items of content may include a graphical user interface similar to the graphical user interfaces described in commonly assigned, currently pending, U.S. patent application Ser. No. 14/577,269, filed Dec. 19, 2014. It should be noted that a graphical user interface enabling a user to provide a subset of items of content may be optimized to enable a user to efficiently select dozens of items of content from a set of hundreds of items of content and may differ from a graphical user interface designed to enable a user to select a single item of content for viewing from a set of dozens of items of content. For example, graphical user interface 500 may present hundreds of items of content in a single view.

As illustrated in FIG. 5A, graphical user interface 500 includes a plurality of icons representing items of content (e.g., movie posters) organized into respective stack structures 502 and stack structures 504A-504B. Each stack structure may represent sub-categories of content (e.g., movies having titles from A-D, movies having titles from E-F, and movies having titles from G-L). As illustrated in FIG. 5A, a user may scroll to the right to view additional stack structures representing additional sub-categories of content. In the example illustrated in FIG. 5A, stack structure 502 is selected and as such may be made available for additional levels of selection. In one example, a user may activate one or more controls on an I/O device (e.g., a single tap or a double tap on a touch-sensitive display, and/or activation of select button 282) to indicate a further selection of stack structure 502. FIG. 5B is a conceptual diagram illustrating an example of a graphical user interface that may be presented when a user indicates a further selection for stack structure 502. As illustrated in FIG. 5B, graphical user interface 500 includes a plurality icons representing movies having titles from E to F. A user may select each item of content included in the graphical user interface illustrated in FIG. 5B (e.g., by using navigational controls 280) and indicate a viewing priority for a selected item of content (e.g., through sequential activations of select button 282, which causes a corresponding number of star outlines to become filled). In this manner, graphical user interface 500 may enable a user to indicate a viewing priority for each of a plurality of items of content. In the example illustrated in FIG. 5B, viewing priorities include high, medium, low, and none. Items of content including at least a low viewing priority may be included in a user watchlist, i.e., within a subset of items of content. It should be noted that in some examples the number of items that may be included in a subset may be limited. For example, in one example, a user may be limited to selecting 10-20 items of content and a message may be provided to the user indicating that the watchlist is full (i.e., a maximum number of items of content have been selected).

As described in detail below, content assistant engine 126 may use user viewing priority values to generate recommended plans (e.g., rank a plan based on the viewing priority of each item of content included in the plan). Further, in some examples, content assistant engine 126 may derive more general user preferences from viewing priority information. For example, if the majority of items of content included as having a high viewing priority are classified as being in the Action/Adventure genre, content assistant engine 126 may determine that a user generally prefers Action movies. Further, in some examples, graphical user interfaces may be presented to a user that enable a user to provide, either implicitly and/or explicitly, preference information. FIG. 8 is a conceptual diagram illustrating an example graphical user interface that may enable a user to provide preference information.

In the example illustrated in FIG. 8, graphical user interface 800 includes category comparison sliders 802A-802C. It should be noted that although in the example illustrated in FIG. 8 the categories of comparison correspond to genre, in other examples, the categories of comparison may corresponded to other information that may be used to determine the preferences of a user. For example, category comparison sliders may include any combination of actors, directors, genres, and/or release date. In the example illustrated in FIG. 8, a user may set a slider value to one of Strongly Disagree (SD), Disagree (D), No preference (N), Agree (A), Strongly Agree (SA). Further, in one example, graphical user interface may include binary preference options (i.e., Disagree or Agree). In another example, a user may provide binary preferences by selected one of two images representing an item of content. For example, two movie poster icons (or actor icons, director icons, or the like) may be presented on display 250 with a message "Which do you prefer?" and a user may select the icon according to his or her personal preference.

Referring again to FIG. 3, computing device 200 provides the subset of items of content to content assistant engine 126 (306) and provides user preference information to content assistant engine 126, which may include viewing priorities and, optionally, general user preference information. Upon receiving a subset of items of content, content assistant engine 126 may convert the subset of item of content into a query set (308). That is, in one example, computing device 200 may provide a subset of content items to content assistant engine 126 according to one metadata format and content assistant engine 126 may convert the metadata format into another metadata format for search purposes. For example, content assistant engine 126 may receive a list of titles for each item of content in the subset and may convert each title in the list to one or more keywords (e.g., a director and title keyword) that may more uniquely identify each item of content or a unique identifier for purposes of performing queries. It should be noted that in some examples a conversion may be unnecessary. That is, computing device 200 may be configured to provide metadata in a format that may be used for search queries.

As illustrated in FIG. 3, content assistant engine 126 provides a query set to search aggregator 124 (310). As described above, search aggregator 124 may be configured to perform a plurality of queries and generate aggregated results. Upon receiving a query set, search aggregator 124 queries media services sites 118A-118N for each of items A to item N included in a subset of items of content and media service sites 118A-118N provide a search result for each item of content (312). In one example, a result may include availability information associated with an item of content (e.g., an indication of whether the item of content is available through the media service) and accessibility information associated with an item of content (e.g., the price to access the item of content). It should be noted that in the example illustrated in FIG. 3, although search aggregator is illustrated as sequentially querying media service site 118A for each item of content and then sequentially querying each subsequent media service site for each item of content, such an illustration does not limit search aggregator 124 to a particular search methodology. That is, the techniques described herein may be generally applicable regardless of particular search algorithms. Further, it should be noted that in some examples, search aggregator 124 may maintain a database indicating the availability and accessibility of items of content and may not need to query each media service site upon receiving a set of queries. That is, recent query results may be stored at search aggregator 124.

Search aggregator 124 aggregates the results for each query (314) and provides the aggregated query results to content assistant engine (316). Upon receiving the query results, content assistant engine 126 may process a set of user constraints, a user defined subset of items of content, user preferences (e.g., each item of content in the subset may be associated with a viewing priority and/or general preferences may be processed), availability and accessibility information associated with items of content within the subset (318). In one example, content assistant engine 126 may generate recommendations for accessing items of content based on a set of user constraints, a user defined subset of items of content, availability and accessibility information associated with item of contents and/or user preference information. In one example, a recommendation may be referred to as an access plan. An access plan may be described as one or more services that enable a user's access to items of content within a subset of items of content given the user's constraints and preferences.

In one example, content assistant engine 126 may generate access plans based on a hierarchical approach. For example, content assistant engine 126 may first determine which subscription based streaming services (e.g., services that provide unlimited access to items of content for a monthly fee) are within a user's budget and/or include a minimum number of items of content (e.g., as specified according to a global settings graphical user interface). For each subscription based streaming service within a user's budget and/or including a minimum number of items of content, content assistant engine 126 may rank each service based on the number of items of content available through the service that are included in a defined subset of items of content. For example, one service may provide access to 6 out of 20 items of content and another service may provide access to 5 out of 20 items of content. Further, in one example, content assistant engine 126 may further rank each subscription based streaming service by weighing available items of content based on a viewing priority associated with each item of content. For example, items of content may be given the following weights based on viewing priority: 3 for high, 2 for medium, and 1 for low. In this example, four high priority items of content may rank higher than six low priority items of content (i.e., 12 vs. 6)). Further, in one example, each item of content may be given an additional weight based on whether the item of content corresponds to a general user preference. For example, in the case where a user prefers action movies, a value of 1 may be added to a viewing priority weight. In one example, content assistant engine 126 may further rank each subscription based streaming service based on accessibility, e.g., price. For example, a $7.99 monthly service may weighed higher than a $9.99 monthly service. In one example, the price may be divided by the total budget and multiplied by the weighted sum of items of content. Equation 1 below provides an example of how a subscription service may be ranked:

$$\text{Ranking}_S = (\text{Budget/Price}) * ((W_{VP} + W_{GP})_1 + \ldots + (W_{VP} + W_{GP})_n) \quad (1)$$

where

Price includes the price to access the subscription service;

Budget includes the budget set by the user. It should be noted that if Budget is set to unlimited or where Price is equal to zero (i.e., free to access) the value of (Price/Budget) may be set equal to a default maximum value;

$W_{VP}$ includes a viewing priority weight and $W_{GP}$ includes a general preference weight for each of the items of content 1 to n available through the subscription service.

In one example, after ranking each subscription based streaming service, content assistant engine 126 may select a subscription based streaming service for inclusion in an access plan and continue to optimize a user's budget by ranking items of content accessible through pay per use. For example, content assistant engine 126 may determine the remaining available budget after subtracting a monthly subscription fee of a streaming service and optimize any remaining budget by ranking items of content based on price, viewing priority, and/or general preference. Content assistant engine 126 may determine each available item of content that can be accessed with the remaining budget and rank each item of content. Equation 2 below provides an example of how individual items of content may be ranked:

$$\text{Ranking}_C = (\text{Budget Remaining/Price}) * (W_{VP} + W_{GP}) \quad (2)$$

where

Price includes the price to access an individual item of content;

Budget Remaining equals the budget set by a user minus the budget of a subscription service included in an access plan, it should be noted that if Budget is set to unlimited or where Price is equal to zero, the value of (Price/Budget Remaining) may be set equal to a default maximum value;

$W_{VP}$ includes a viewing priority weight for the item of content and $W_{GP}$ includes a general preference weight for an item of content.

An example case of ranking items of content may include a case where if a remaining budget is $9.99, content assistant engine 126 may include the option of renting two high viewing priority movies for $4.99 each or alternatively renting three medium viewing priority movies for $2.99 each based on viewing priority values and/or general preference values. In this manner, in one example, the sum of $\text{Ranking}_S$ (or an alternative ranking value) for a subscription based streaming service and the $\text{Ranking}_C$ each item of content may be used to rank an access plan.

Figure 6A:
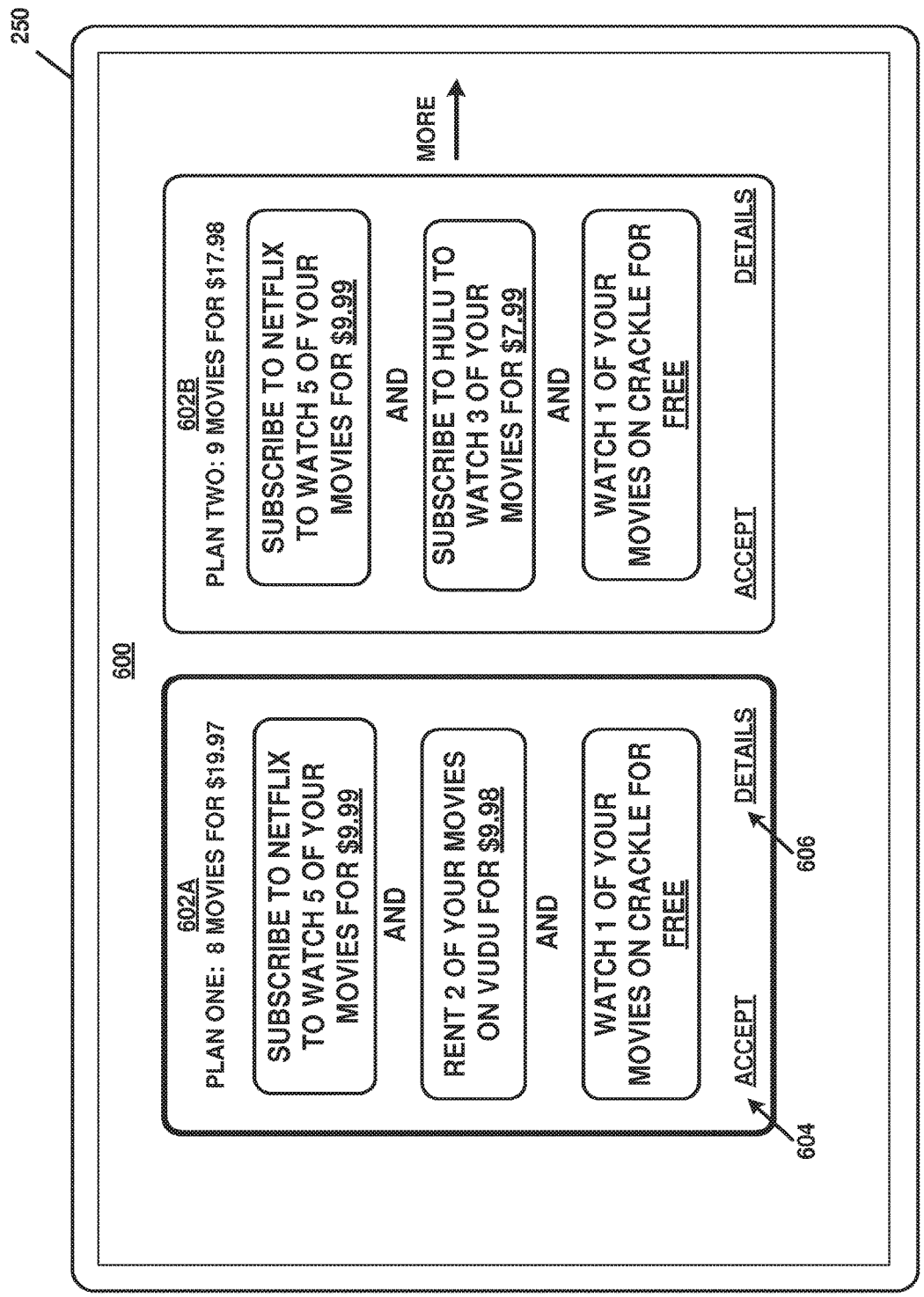
Figure 6B:
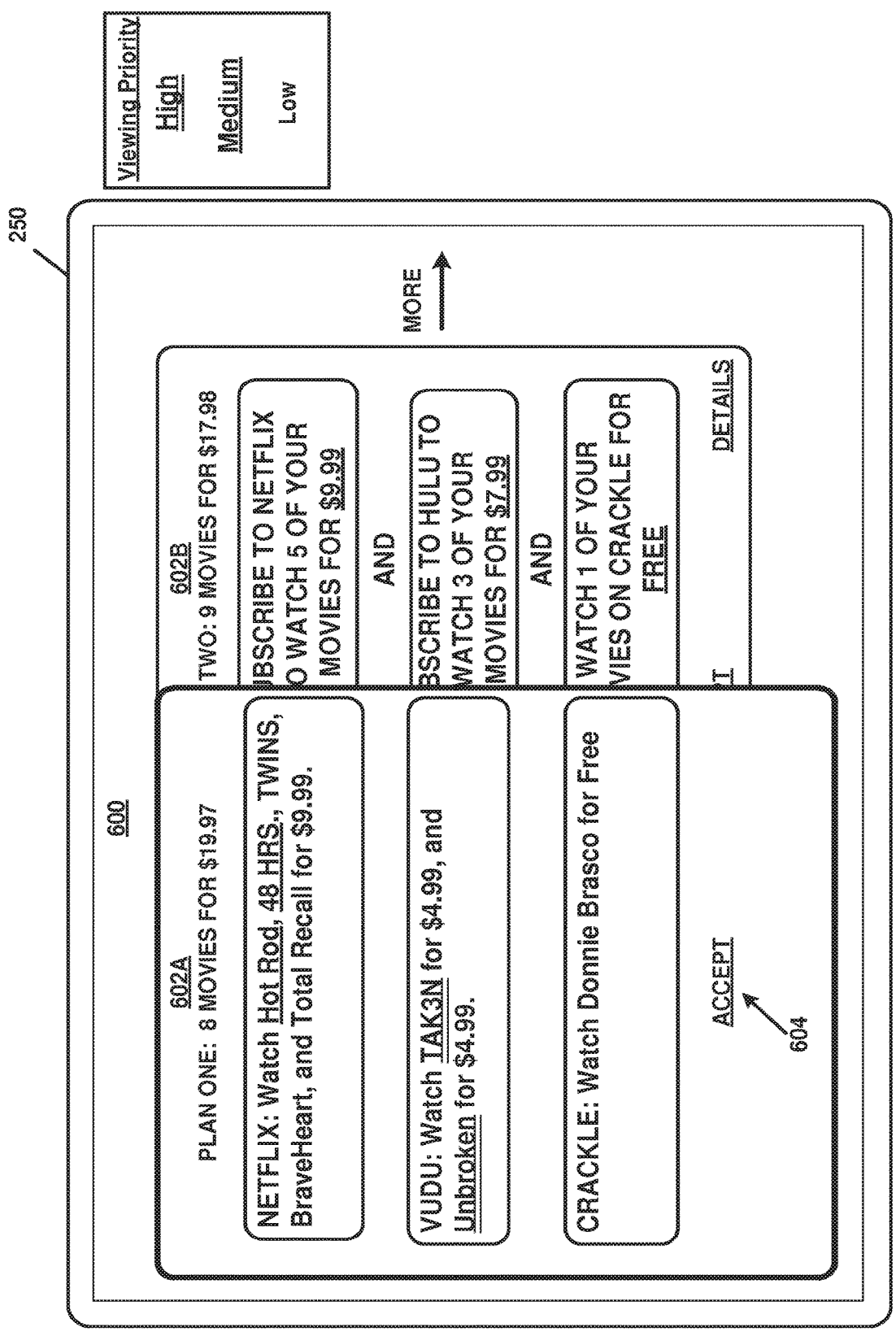

As illustrated in FIG. 3, access plans may be provided to computing device 200 (320). Upon receiving recommendations, computing device 200 may be configured to generate a graphical user interface presenting access plans to user and enable a user to access items of content through services included in an access plan. As described above, the number of recommended access plans presented to a user may be limited based on a global setting. For example, a user may only wish to choose between two access plans. In this case, the highest ranking access plans may be presented to a user. FIGS. 6A-6C are conceptual diagrams illustrating example graphical user interfaces that may enable a user to access items of content based on recommendations provided by content assistant engine 126. As illustrated in FIG. 6A, graphical user interface 600 includes recommendation panes 602A-602B. In the example illustrated in FIG. 6A, a user may select a recommendation pane (e.g., using navigational arrows 280). As further illustrated in FIG. 6A, a user may scroll to the right to view and select additional recommendation panes (if available). Thus, any number of recommendations may be presented to a user.

As illustrated in FIG. 6A, a recommendation pane includes a summary of an access plan (e.g., "Plan One: 8 movies for $19.97) and a summary of each service included in the recommendation (e.g., "Subscribe to Netflix to watch 5 of your movies for $9.99," "Rent 2 of your movies on VUDU for $9.98," and "Watch 1 of you movies of Crackle for Free"). Each recommendation pane includes accept link 604 and details link 606. Upon activation, details link 606 may cause a graphical user interface including more detailed information for an access plan to be presented. FIG. 6B illustrates an example of a graphical user interface including more detailed information for an access plan.

As illustrated in FIG. 6B, recommendation pane 602A displays titles of items of content, specific price information, and an indication of viewing priority for each item of content. An indication of viewing priority for each item of content may be illustrated using one or more techniques (e.g., font types, color coding, etc.). Further, as illustrated in FIG. 69, recommendation pane 602A includes accept link 604. Upon activation of accept link 604, computing device 200 may perform actions that facilitate access of items of content by a user. For example, computing device 200 may cause a user to sign-up for services e.g., using user provided billing information), cancel existing services, and/or queue up the items of content (e.g., add items of content to a queue provided by a service). It should be noted that the level of facilitation may depend on information provided by a user, preferences provided by a user, and/or the level of facilitation supported by a service. For example, upon accepting a recommended access plan, a user may or may not wish to confirm a purchase of a subscription. Thus, one or more intermediate graphical user interfaces may be presented to a user, upon a user accepting a recommendation. FIG. 6C illustrates an example of a graphical user interface that may be presented upon a user accepting a recommended access plan. As illustrated in FIG. 6C, graphical user interface 600 includes a recommendation accepted pane 608 which includes icons that upon activation, enable a user to access items of content through a particular service. In this manner, computing device 200 represents an example of a computing device configured to facilitate access to items of content.

In one example, in addition to generating access plans, content assistant engine 126 may manage subscription services on behalf of a user. For example, content assistant engine 126 may include one or more servers storing information associated with an account of a user. In one example, a user may be able to add a credit equivalent to his or her account. In one example, content assistant engine 126 may communicate with media service providers 118A-118N to enable computing device 200 to access services. Further, content assistant 126 may communicate with media service providers 118A-118N to enable computing device 200 to cancel, and, for example, not be charged for access to a service. In this manner, content assistant engine 126 may act as agent for a user and abstract the management of services. Further, in one example, content assistant engine 126 may cause items of content included in an accepted access plans to be queued up (e.g., added to a watch list) for respective services.

As described herein, in one example, a method of facilitating access to items of content comprises presenting a graphical user interface enabling a user to set constraints with respect to accessing items of content, providing a graphical user interface enabling a user to define a subset of items of content from a set of items of content, receiving one or more access plans based at least in part on the constraints and the subset of items of content, and presenting a graphical user interface enabling a user to accept one of the one or more access plans. In one example, enabling a user to set constraints includes enabling a user to set a monthly budget constraint. In one example, enabling a user to set constraints includes enabling a user to set a maximum maturity rating for items of content. In one example, the set of items of content includes a prescreened set of items of content based at least in part on the constraints. In one example, the method further comprises enabling a user to associate a viewing priority for each item of content in the subset of items of content, and generating one or more access plans is further based at least in part on an associated viewing priority. In one example, an access plan specifies one or more digital media services providing availability to at least one item of content included in the subset of items of content. In one example, an access plan specifies at least one digital media service to provide access to at least one item of content included in the subset of items of content accessible based on a monthly subscription fee and at least one other digital media service to provide access to at least one item of content included in the subset of items of content based on a pay per use fee. In one example, presenting the graphical user interface enabling a user to accept one of the one or more access plans presents a number of recommended access plans based on a user constraint.

As described herein, in one example, an apparatus for facilitating access to items of content comprises means for receiving a budget constraint with respect to accessing items of content, means for receiving a subset of items of content, where each item of content within the subset is associated with a viewing priority, and means for generating an access plan based on the budget constraint, wherein the access plan specifies one or more digital media services to provide access to the items of content based on a fee associated with the accessing each item of content by the one or more digital media services, wherein the fee is a subscription fee or pay per use fee. In one example, the budget constraint includes a monthly budget constraint, an item based budget constraint, or a profile based budget constraint. In one example, generating the access plan further comprises ranking the one or more digital media services based at least in part on a total number of items of the subset of items of content available through each digital media service of the one or more digital media services. In one example, ranking the one or more digital media services further includes assigning a weight value to each item of content available through the digital media service of content within the subset. In one example, the weight value is based at least in part on the viewing priority value, a general preference value, or the budget constraint.

As described herein, in one example, a system for facilitating access to items of content comprises a content assistant engine comprising a processing device configured to receive one or more constraints associated with accessing items of content, provide a prescreened set of available items of content based on the received constraint, receive a subset of items of content within the prescreened set, receive query results specifying the items of content within the subset of items of content that are available through one or more media services, and generate an access plan based on the received constraints and the received query results. In one example, the constraint includes a maximum maturity rating for items of content. In one example, access plan specifies one or more digital media services to provide at least one item of content included in the subset of items of content. In one example, the access plan specifies at least one digital media service to provide access to at least one item of content included in the subset of items of content, the at least one item of content is accessible based on a monthly subscription fee, and at least one digital media service is able to provide access to at least one additional item of content included in the subset of items of content, and the at least one additional item of content is accessible based on a pay per use fee. In one example, to generate the access plan includes to select a digital media service based on a ranking value, wherein the selected digital media service provides access to at least one item of content included in the subset of items of content accessible for a monthly subscription fee. In one example, the ranking value is based at least in part on a viewing priority associated with items of content. In one example, the ranking value is further based at least in part on a price of the monthly subscription fee.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal. Which is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:

receiving, from a computing device, first data specifying a set of content items selected by a user and second data specifying a priority for viewing each content item in the set of content items;

determining, by one or more hardware processors, a total number of content items from the set of content items that are accessible through each digital media service of a plurality of digital media services, each digital media service provided by one or more digital media service systems;

determining, by the one or more hardware processors, a ranking of the plurality of digital media services based at least in part on the total number of content items from the set of content items that are accessible through each digital media service of the plurality of digital media services and the priority for viewing each content item in the set of content items;

generating, by the one or more hardware processors, a plan including at least one digital media service of the plurality of digital media services for providing access to at least a portion of the set of content items based on the ranking; and configuring, by the one or more hardware processors, access to the at least one digital media service based on the plan to provide access to specific content based on the plan.

2. The method of claim 1, wherein the identifying of the total number of content items that are accessible through each digital media service of the plurality of digital media services comprises:

generating one or more queries based on the set of content items;

transmitting the one or more queries to the one or more digital media service systems; and aggregating one or more responses received from the one or more digital media service systems, each of the one or more responses corresponding to a query in the one or more queries.

3. The method of claim 1, wherein the identifying of the total number of content items that are accessible through each digital media service of the plurality of digital media services comprises:

accessing a database that includes information indicating accessibility of content items provided by one or more digital media services of the plurality of media services.

4. The method of claim 1, wherein the determining of the ranking of the plurality of digital media services is further based on one or more constraints.

5. The method of claim 4, wherein the one or more constraints include one or more of: a financial constraint or a content rating.

6. The method of claim 4, wherein the one or more constraints comprise at least one user specified constraint.

7. The method of claim 1, wherein the at least one digital media service provides access to at least one content item from the set of content items based on a monthly subscription fee.

8. The method of claim 1, wherein the at least one digital media service provides access to at least one content item included in the set of content items based on a pay per use fee.

9. The method of claim 1, wherein the determining of the ranking of the plurality of digital media services includes assigning a weight value to each content item from the set of content items that is accessible through each digital media service in the plurality of media services based in part on the priority for viewing each content item.

10. The method of claim 1, wherein the priority for viewing each content item includes one of: high, medium, or low.

11. A system comprising:

one or more processors; and a memory accessible to the one or more processors, the memory storing instructions which, upon execution by the one or more processors, causes the one or more processors to perform operations comprising:

receiving, from a computing device, first data specifying a set of content items selected by a user and second data specifying a priority for viewing each content item in the set of content items;

determining a total number of content items from the set of content items that are accessible through each digital media service of a plurality of digital media services, each digital media service provided by one or more digital media service systems;

determining a ranking of the plurality of digital media services based at least in part on the total number of content items from the set of content items that are accessible through each digital media service of the plurality of digital media services and the priority for viewing each content item in the set of content items;

generating a plan including at least one digital media service of the plurality of digital media services for providing access to at least a portion of the set of content items based on the ranking; and configuring access to the at least one digital media service based on the plan to provide access to specific content based on the plan.

12. The system of claim 11, wherein the identifying of the total number of content items that are accessible through each digital media service of the plurality of digital media services comprises:

generating one or more queries based on the set of content items;

transmitting the one or more queries to the one or more digital media service systems; and aggregating one or more responses received from the one or more digital media service systems, each of the one or more responses corresponding to a query in the one or more queries.

13. The system of claim 11, wherein the identifying of the total number of content items that are accessible through each digital media service of the plurality of digital media services comprises:

accessing a database that includes information indicating accessibility of content items provided by one or more digital media services of the plurality of media services.

14. The system of claim 11, wherein the determining of the ranking of the plurality of digital media services is further based on one or more constraints.

15. The system of claim 14, wherein the one or more constraints include one or more of: a financial constraint or a content rating.

16. The system of claim 14, wherein the one or more constraints comprise at least one user specified constraint.

17. The system of claim 11, wherein the plan specifies:

a first digital media service to provide access to a first content item from the set of content items based on a monthly subscription fee; and a second digital media service to provide access to a second content item included in the set of content items based on a pay per use fee.

18. The system of claim 11, wherein the determining of the ranking of the plurality of digital media services includes assigning a weight value to each content item from the set of content items that is accessible through each digital media service in the plurality of media services based in part on the priority for viewing each content item.

19. The system of claim 11, wherein the priority for viewing each content item includes one of: high, medium, or low.

20. A non-transitory machine readable medium storing instructions that, when executed by one or more processors, cause the one or more processors to perform operations comprising:

receiving, from a computing device, first data specifying a set of content items selected by a user and second data specifying a priority for viewing each content item in the set of content items;

determining a total number of content items from the set of content items that are accessible through each digital media service of a plurality of digital media services, each digital media service provided by one or more digital media service systems;

determining a ranking of the plurality of digital media services based at least in part on the total number of content items from the set of content items that are accessible through each digital media service of the plurality of digital media services and the priority for viewing each content item in the set of content items;

generating a plan including at least one digital media service of the plurality of digital media services for providing access to at least a portion of the set of content items based on the ranking; and configuring access to the at least one digital media service based on the plan to provide access to specific content based on the plan.

\* \* \* \* \*